(12) United States Patent
Perrins et al.

(10) Patent No.: US 11,064,691 B2
(45) Date of Patent: Jul. 20, 2021

(54) FABRIC LAYING SYSTEM AND METHOD

(71) Applicant: Block-Aid Inc., Carp (CA)

(72) Inventors: Rob Perrins, Kanata (CA); John Cooke, Kanata (CA); Ian Eckersley, Ottawa (CA); David Clarke, Carleton Place (CA)

(73) Assignee: Block-Aid Inc., Carp (CA)

( * ) Notice: Subject to any disclaimer, the term of this patent is extended or adjusted under 35 U.S.C. 154(b) by 0 days.

(21) Appl. No.: 16/062,847

(22) PCT Filed: Dec. 16, 2016

(86) PCT No.: PCT/CA2016/051500
§ 371 (c)(1),
(2) Date: Jun. 15, 2018

(87) PCT Pub. No.: WO2017/100942
PCT Pub. Date: Jun. 22, 2017

(65) Prior Publication Data
US 2018/0368388 A1 Dec. 27, 2018

Related U.S. Application Data

(60) Provisional application No. 62/268,401, filed on Dec. 16, 2015.

(51) Int. Cl.
*A01M 21/00* (2006.01)
*B65H 23/182* (2006.01)
(Continued)

(52) U.S. Cl.
CPC ........... *A01M 21/00* (2013.01); *B65H 23/185* (2013.01); *B65H 23/1825* (2013.01); *B65H 35/06* (2013.01); *A01G 13/025* (2013.01); *B65H 2301/5142* (2013.01); *B65H 2301/51512* (2013.01); *B65H 2513/11* (2013.01);
(Continued)

(58) Field of Classification Search
CPC . A01M 21/00; B65H 23/1825; B65H 23/185; B65H 35/06; E02B 3/00; E02B 3/12
See application file for complete search history.

(56) References Cited

U.S. PATENT DOCUMENTS 2,390,403 A * 12/1945 Van Der Rest ......... E02B 3/121
405/17
4,056,936 A * 11/1977 Mayer .................... E02B 3/126
405/302.7
(Continued)

*Primary Examiner* — Benjamin F Fiorello
(74) *Attorney, Agent, or Firm* — Servilla Whitney LLC

(57) ABSTRACT

The present disclosure relates to systems and methods related to the suppression of invasive plant species by laying down a fabric over beds of such invasive plants. A watercraft with a fabric laying mechanism is provided with the mechanism automatically guiding the fabric from a fabric stockpile to a frame that spreads the fabric prior to the fabric being laid over the underwater plant bed. The watercraft may be provided with a device for dispensing material over the fabric that has been laid down to weigh down or hold down the fabric. Preferably, the fabric is biodegradable and the material is natural to the area. In one implementation, the fabric (e.g jute burlap) is coarsely woven from natural plant fibers.

15 Claims, 20 Drawing Sheets

(51) Int. Cl.
*B65H 23/185* (2006.01)
*B65H 35/06* (2006.01)
*A01G 13/02* (2006.01)

(52) U.S. Cl.
CPC .... *B65H 2515/31* (2013.01); *B65H 2701/174* (2013.01); *Y02A 90/40* (2018.01)

(56) References Cited

U.S. PATENT DOCUMENTS

| | | | | |
|---|---|---|---|---|
| 4,379,655 A * | 4/1983 | Brost | ............ | A01G 25/00 |
| | | | | 405/176 |
| 4,480,943 A * | 11/1984 | Leuenberger | ............ | F16L 1/123 |
| | | | | 405/158 |
| 4,518,280 A * | 5/1985 | Fletcher | ............ | E02B 3/126 |
| | | | | 405/15 |
| 4,577,996 A * | 3/1986 | Elias | ............ | E02B 17/0017 |
| | | | | 405/17 |
| 4,854,773 A * | 8/1989 | Nicoll | ............ | E02B 3/12 |
| | | | | 405/19 |
| 5,775,836 A * | 7/1998 | Dean, Jr. | ............ | E02B 3/121 |
| | | | | 405/17 |
| 6,299,094 B1 * | 10/2001 | James, Jr. | ............ | A01G 13/0287 |
| | | | | 242/390 |
| 6,957,932 B1 * | 10/2005 | Schillinger | ............ | A01G 13/0268 |
| | | | | 405/15 |
| 7,083,358 B2 * | 8/2006 | Grosjean | ............ | E02B 3/122 |
| | | | | 405/129.9 |
| 8,430,601 B1 * | 4/2013 | Chadwick | ............ | E02F 5/106 |
| | | | | 405/159 |
| 2017/0208743 A1 * | 7/2017 | Roure | ............ | A01D 44/00 |

* cited by examiner

FABRIC LAYING SYSTEM AND METHOD

CROSS-REFERENCE TO RELATED APPLICATIONS

This application is the National Stage entry of PCT/CA2016/051500, filed on Dec. 16, 2016, which claims priority U.S. Provisional Appln. Ser. No. 62/268,401, filed on Dec. 16, 2015, which are incorporated herein by reference in their entireties.

TECHNICAL FIELD

The invention relates to the field of invasive plant control, and more specifically to a system and method for laying fabric underwater to suppress such invasive plants.

BACKGROUND

Eurasian water-milfoil is a very invasive water plant native to Europe, Asia and Northern Africa. The plant was introduced in the United States through the aquarium trade in the 1950s. Over the years, the plants spread from aquariums to lakes, due to the lack of controls regarding the disposal of aquarium contents. The plants were then spread between lakes by fragments attached to boats and boat trailers (and any other aquatic equipment). Eurasian water-milfoil is currently one of the primary sources of environmental damage across Canada and the USA. Other similar plants (e.g. Brazilian milfoil) are also an issue in Europe.

Fragments of such plants can stay alive for weeks out of water if these fragments are kept moist. Although this invasive water plant has been around for decades, it has become a significant environmental issue across North America over the last 5 to 10 years. One of the reasons that this plant is so invasive is that it spreads through stem fragmentation; i.e. if a single plant is cut into 5 pieces, it will grow 5 more plants from those pieces. When the plant infests an area, it can form thick underwater strands of tangled stems as well as vast mats of vegetation at the water's surface.

When an area is infested, such dense growth of milfoil displaces indigenous plants and prevents fish from laying eggs in the infested area. This reduces the indigenous plant growth, negatively affects fish populations, and makes recreational use of such areas difficult or impossible.

A significant increase in the milfoil growth rate can occur when the plant spreads into high boat traffic areas on lakes and rivers. Such high boat traffic areas include boat launch zones and shallow waterways with high traffic as well as areas that are adjacent to cottage docks. These areas significantly contribute to the growth rate of the milfoil plant since the propellers of each powered boat passing through the infested areas has the potential to chop up hundreds to thousands of milfoil plants. This then leads to the re-growth of hundreds to thousands of new plants.

A study conducted by a non-profit organization involved laying burlap cloth over beds of milfoil with the cloth being held down with sandbags. The study showed that the burlap cloth killed off the milfoil over time while allowing the indigenous species to grow. This burlap solution is completely biodegradable and allows the indigenous plants to regain their dominance while killing off the milfoil. Unfortunately, the current challenge is that, although burlap can be sold for approximately $1 per square meter, the installation costs are between $3 and $4 per square meter to manually lay down the burlap over the milfoil beds. At an installed cost of $4-$5 per square meter, this burlap solution is cost prohibitive. As well, such a manual solution may be time consuming and would involve inordinate amounts of workers. Therefore, a system that is cheaper and faster would be desirable.

SUMMARY

The present disclosure relates to systems and methods related to the suppression of invasive plant species by laying down a fabric over beds of such invasive plants. A watercraft with a fabric laying mechanism is provided with the mechanism automatically guiding the fabric from a fabric stockpile to a frame that spreads the fabric prior to the fabric being laid over the underwater plant bed. The watercraft may be provided with a device for dispensing material over the fabric that has been laid down to weigh down or hold down the fabric. Preferably, the fabric is biodegradable and the material is natural to the area. In one implementation, the fabric (e.g jute burlap) is coarsely woven from natural plant fibers.

In one aspect, this document discloses a system for laying fabric over an underwater plant bed, the system comprising: a fabric dispensing mechanism for dispensing fabric from a fabric stockpile; a frame receiving said fabric from said fabric dispensing mechanism, said frame being for guiding said fabric over said plant bed, wherein said fabric is laid atop said plant bed when said fabric has been guided over said plant bed such that at least a portion of said plant bed is covered by said fabric.

In another aspect, this document discloses a method for laying fabric over an underwater plant bed, the method comprising: dispensing a fabric from a fabric stockpile; guiding said fabric from said fabric stockpile to a frame; guiding said fabric through said frame to thereby spread said fabric across said frame; guiding said fabric such that said fabric is above a portion of said plant bed; and placing said fabric atop at least said portion of said plant bed to thereby cover said portion of said plant bed with said fabric.

BRIEF DESCRIPTION OF THE DRAWINGS

The following figures serve to illustrate various embodiments of features of the disclosure. These figures are illustrative and are not intended to be limiting.

DETAILED DESCRIPTION

The following embodiments are merely illustrative and are not intended to be limiting. It will be appreciated that various modifications and/or alterations to the embodiments described herein may be made without departing from the disclosure and any modifications and/or alterations are within the scope of the contemplated disclosure.

Figure 1:
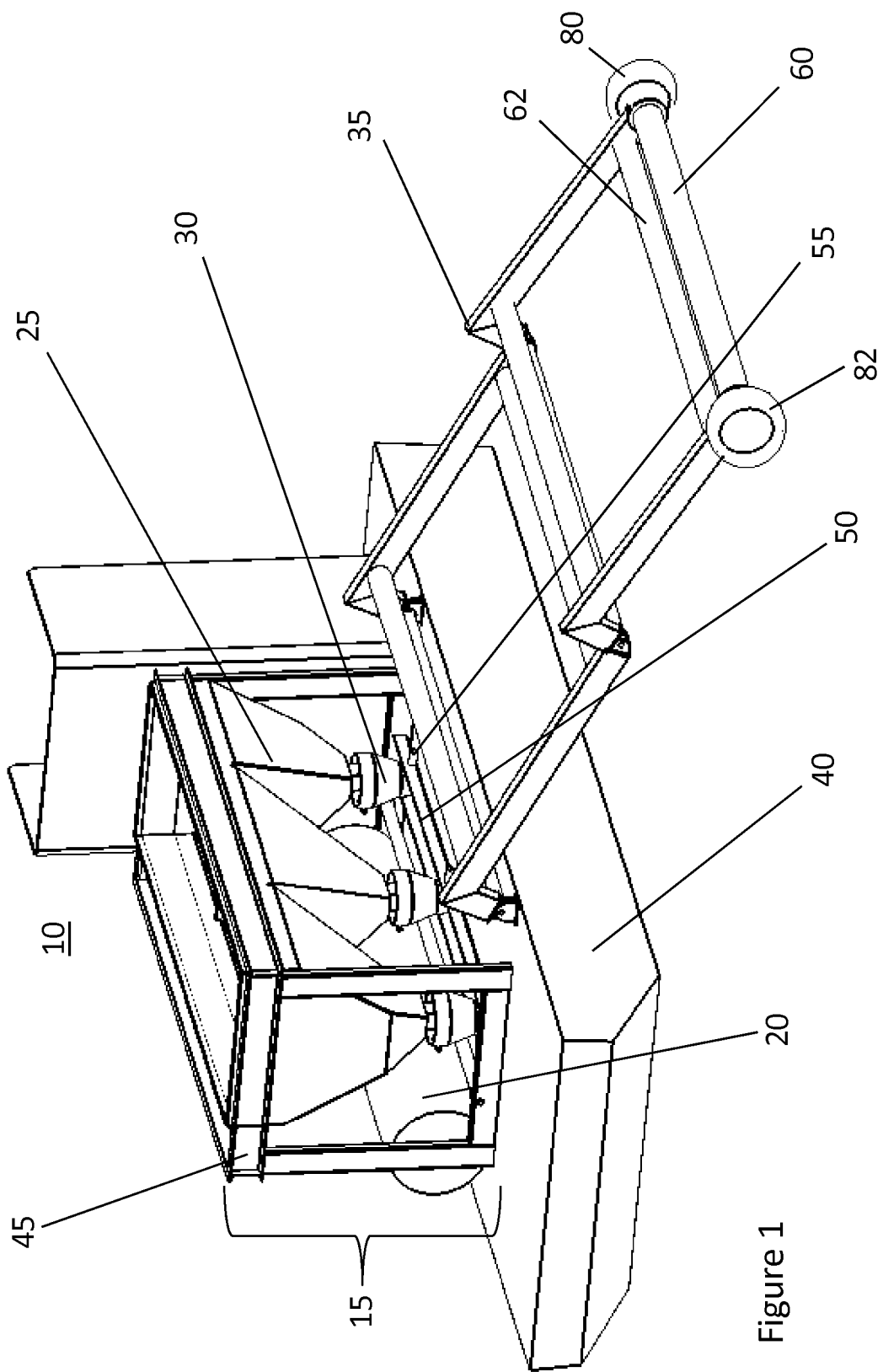
FIG. 1 is a front perspective view of a fabric laying system installed on a barge, according to an embodiment of the present disclosure.
Figure 2:
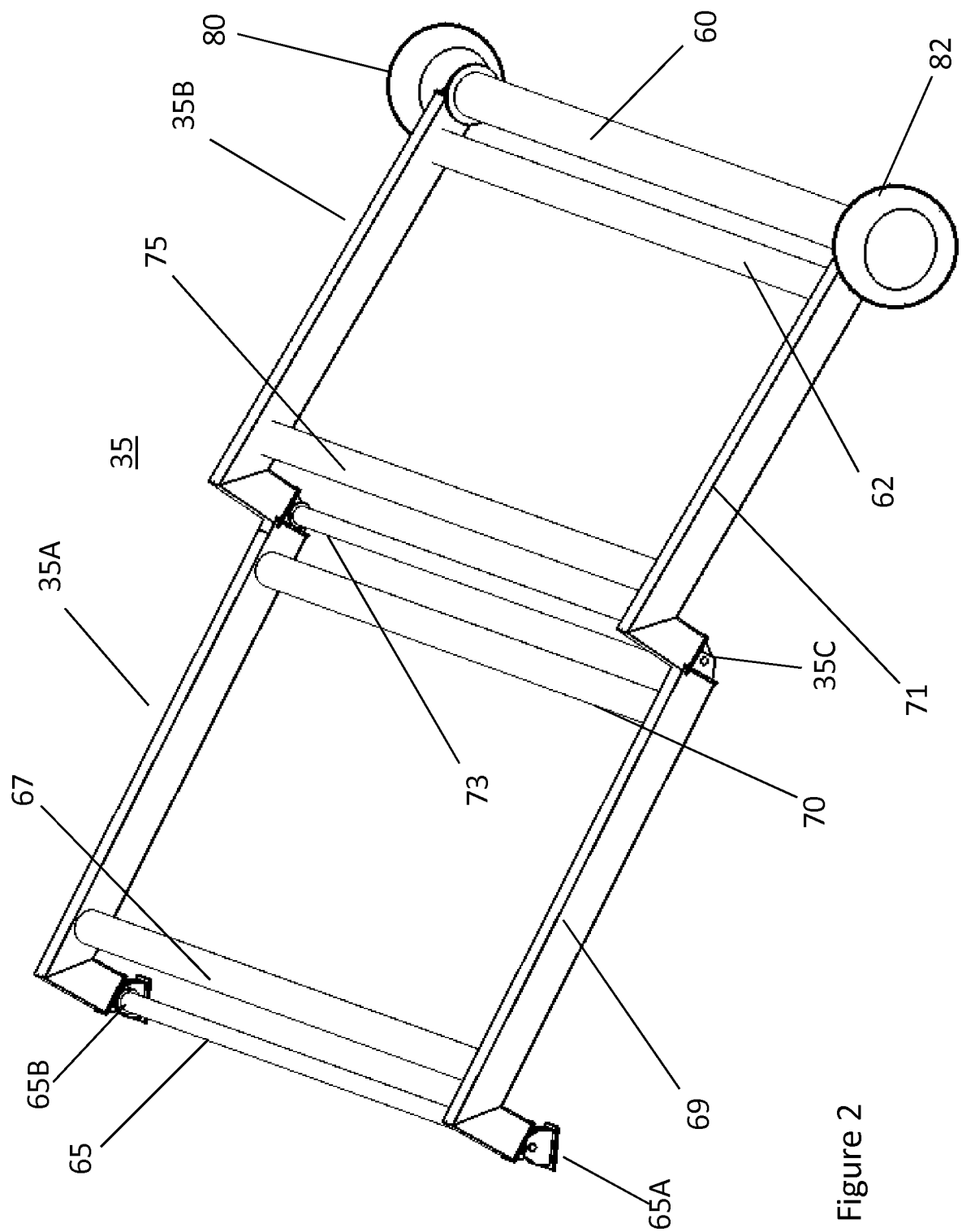
FIG. 2 is a perspective view of an articulated frame of a fabric laying system, according to an embodiment of the present disclosure.

With reference to FIG. 1 and according to an embodiment of the present disclosure, a fabric laying system 10 is shown. The system 10 has a fabric dispensing mechanism 15 to dispense fabric from a stockpile such as one or more rolls of fabric 20. The mechanism 15 cooperates with an articulated frame 35 to guide, spread, and lay the fabric over the underwater plant beds. The fabric from the fabric roll 20 is guided through a path that leads under a structure 45 and on to the articulated frame 35. From the end of the frame 35, the spread fabric is laid over the plant bed as the frame 35 traverses over the plant bed.

The articulated frame 35 has a first portion 35A and a second portion 35B with the two portions being attached to each other by way of a pair of joints 35C. As can be imagined, the articulated frame 35 pivots about the joints 35C. First portion 35A has front rollers 65, 67 and mid roller 70. Rollers 65, 70 provide structural support for the two sides of the first portion 35A of the frame 35. Roller 65 is attached to the frame 35 and to joints 65A, 65B. Joints 65A, 65B provide coupling points between the frame 35 and the watercraft carrying the fabric roll 20. The second portion 35B has mid roller 75 and end rollers 62, 60. The rollers 75 and 62 provide structural support between the two sides of the second portion 35B of the frame 35. A roller 73 is attached between the pair of joints 35C. The different rollers of the frame 35 guide the fabric from the roll 20 to the end roller 60 as well provide support against shearing forces for the frame 35. The fabric is weaved from the fabric roll 20 through rollers 65, 67, 70, 73, 75, and 62 to finish at end roller 60. It should be clear that, in one embodiment, the end roller 60 is driven by a drive motor that grips and pulls the fabric through the above path. In another embodiment, the roller 62 may also be driven by either the same motor or another drive motor to assist in pulling the fabric from the fabric roll 20 to the end roll 60. The driven end rollers 60 (and possibly roller 62) may grasp the fabric by means of friction or be mechanically assisted by means of hooks, spikes, or other mechanical means of grasping the fabric. To further assist in pulling and guiding the fabric from the fabric roll 20, a second drive system may also be used to provide a more effective pulling mechanism. Preferably, a cutting mechanism is also employed to ensure that the fabric is cut when enough fabric has been laid over an area. The various rollers may be constructed from ridged pipe, sleeves on pipes, or any other suitable material or configuration to allow the rollers to perform their functions. It should be clear that the drive system for pulling the fabric may use hydraulics, pneumatics, or electronics to pull, grasp, and/or guide the fabric over the plant bed. It should also be clear that when the roll of burlap 20 is new and therefore full and quite heavy, a powered tension control mechanism (not shown) may be used to control the feed of the burlap 20. This would lessen the power required from the first and second end rollers 60, 62 to pull the fabric from the fabric roll to the plant bed.

To assist the frame 35 in travelling across the floor of the body of water or across the plant beds, wheels 80, 82 may be provided. As should be clear, when the watercraft travels across the body of water, the frame 35 is dragged behind the watercraft while laying down the fabric over the plant beds. The wheels 80, 82 would help the frame 35 travel across the lake bed or river bed infested with the invasive plant species.

In one embodiment, as the fabric is laid atop the plant bed, it is preferred that the fabric be weighed down to prevent the fabric from being displaced from its location by underwater currents. As well, weighing down the fabric would prevent the fabric from being displaced by gases which may be emitted by the plants. To weigh down the fabric, material may be deposited atop the laid down fabric. A material depositing mechanism may be used for this function. Referring to FIG. 1, such a material depositing mechanism is illustrated. In this embodiment, at least one hopper 25 is used to receive and contain sand. Each hopper 25 has at least one corresponding funnel 30 with the corresponding funnel 30 receiving sand from a lower end of the hopper 25. The funnel 30 is used to combine sand from the hopper 25 with water from a water pump (not shown). The sand and water mixture is then siphoned to a tube (not shown) connected to the funnel 30. From the tube, the sand and water mixture is then deposited atop the fabric that has been laid down. The sand thereby weighs down the laid down fabric and prevents the fabric from being displaced from atop the plant bed.

It should be clear that while the above description uses sand, other particulate materials or other materials which can be deposited on top of the laid down fabric may also be used. Small stones, gravel, or other matter or material that is heavier than water may be used. Preferably, such material is natural and indigenous to the area where the fabric is being laid.

In the embodiment disclosed in FIG. 1, the material depositing mechanism uses the structure 45 to secure the hoppers 25. A funnel support frame 50 is also disclosed, secured within the structure 45 and serving to support the at least one funnel 30. Each funnel 30 may use a nozzle 55 at a lower end of the funnel and this nozzle is coupled to a hose (not shown). The hose (not shown) travels along the length of the articulated frame 35 and ends at or near the end rollers 60, 62. In operation, material from the hopper 25 travels into the funnel 30 and a water pump (not shown) pumps a continuous flow of water into the funnel 30, creating a mixture. This mixture is then conveyed by way of the nozzle 55 and hose to the section of the frame 35 near rollers 60, 62. In operation, the material is continuously deposited atop the sides of the laid down fabric. In another implementation, instead of a continuous line of material to weigh down the fabric, the flow of the material through the hose is controlled so that the material is only deposited at specific points on the laid down fabric. Since the fabric and the material are dispensed as the watercraft travels on water, the watercraft may be stopped after travelling a specific distance to allow the material to be deposited in piles on top of the laid down fabric. Of course, for this implementation, once the watercraft is stopped, the motor driving the end rollers may also be stopped to prevent fabric from accumulating at a specific spot. However, once the watercraft is stopped, the material flow may be started to, as noted above, deposit the material at specific piles on the already laid down fabric.

It should be clear to a worker skilled in the art that, while the system 10 preferably weighs down the fabric underwater, the fabric need not be weighed down to fulfill its function of covering and suppressing the growth of invasive plants such as milfoil. In one implementation, jute burlap is used as the fabric and the system 10 can create a grid of 6 feet×6 feet of fabric and 10-pound sand piles can be deposited on the fabric laid down. In experiments, it was found that 10-pound sand piles on a 6×6 foot fabric grid provided suitable results. However, a worker skilled in the art would appreciate that different volumes of material on different area sizes of laid down fabric may also provide suitable results. Similarly, instead of stopping the watercraft and depositing material at specific piles, a continuous stream of material deposited on the fabric laid down may also provide acceptable results.

It should be clear that the speed at which the fabric is laid down underwater is, preferably, coordinated with the speed at which the watercraft is travelling across the water. A watercraft travelling faster than the speed at which the fabric is being laid may result in having the fabric dragged across the plant bed. Similarly, a watercraft travelling slower than the speed at which the fabric is being laid may result in an uneven coverage of the plant bed as fabric may bunch up and be laid unevenly.

To control the material being deposited on the fabric laid down, the system 10 may use a valve (not shown) to open and close access between the hopper 25 and the funnel 30, or between the funnel 30 and the hose. The valve could be operated by a hydraulic cylinder or other similar mechanism. A worker skilled in the art would appreciate that a water separator (not shown) may be used at the lower end of the hose (not shown) near the frame 35 to control the amount of material deposited on the fabric. Such a water separator would divert water away in the mixture and would concentrate material deposited on the fabric such that a more concentrated pile of material is left on the fabric. A worker skilled in the art would further appreciate that an agitator (not shown) or an auger (not shown) could be used with the hopper 25 to help move the material. Rain covers (not shown) could also be provided to protect the material, such as sand, in the hopper 25 and the fabric from getting water logged prior to their use.

A worker skilled in the art would also appreciate that in another embodiment, the hopper 25 could be a different type of container provided that it can dispense material such as sand into the funnels 30.

The system 10 may use a pneumatic, hydraulic, or electrical based cutting mechanism (not shown) located at the end of the articulated frame 35 to cut the fabric at any desired length as required.

It should also be clear that although the articulated frame 35 is shown in FIG. 1 in a deployed or open position, the articulated frame 35 can also be folded with the assistance of a suitable mechanism known in the art, to a storage or closed position. Such a mechanism may use hydraulic, pneumatic, or electrical means to properly fold the frame 35 into a closed configuration. It should further be clear that the articulated frame may use other configurations to perform its functions. As such, the frame 35 may be a single one-piece frame, a telescopic frame, as well as other types known in the art. Other variants of the different parts of the system are also possible. The two wheels 80, 82 shown in FIG. 1 and which facilitate the movement of the articulated frame 35 along the water floor may be replaced with skids and sheeting when the lake or river bed is mostly very soft silt. Such a configuration would also help when the frame needs to be dragged through significant depths of silt. This configuration would also help to push the milfoil down closer to the water floor (benthic layer) as the sheeting would be dragged over the milfoil. As another variant, mechanisms used to assist in the deployment and/or storage of the frame may also be used to lift or adjust the positioning of the frame in the event the wheels or the skids are caught in underwater obstructions such as logs, rocks, or other debris.

Figure 3A:
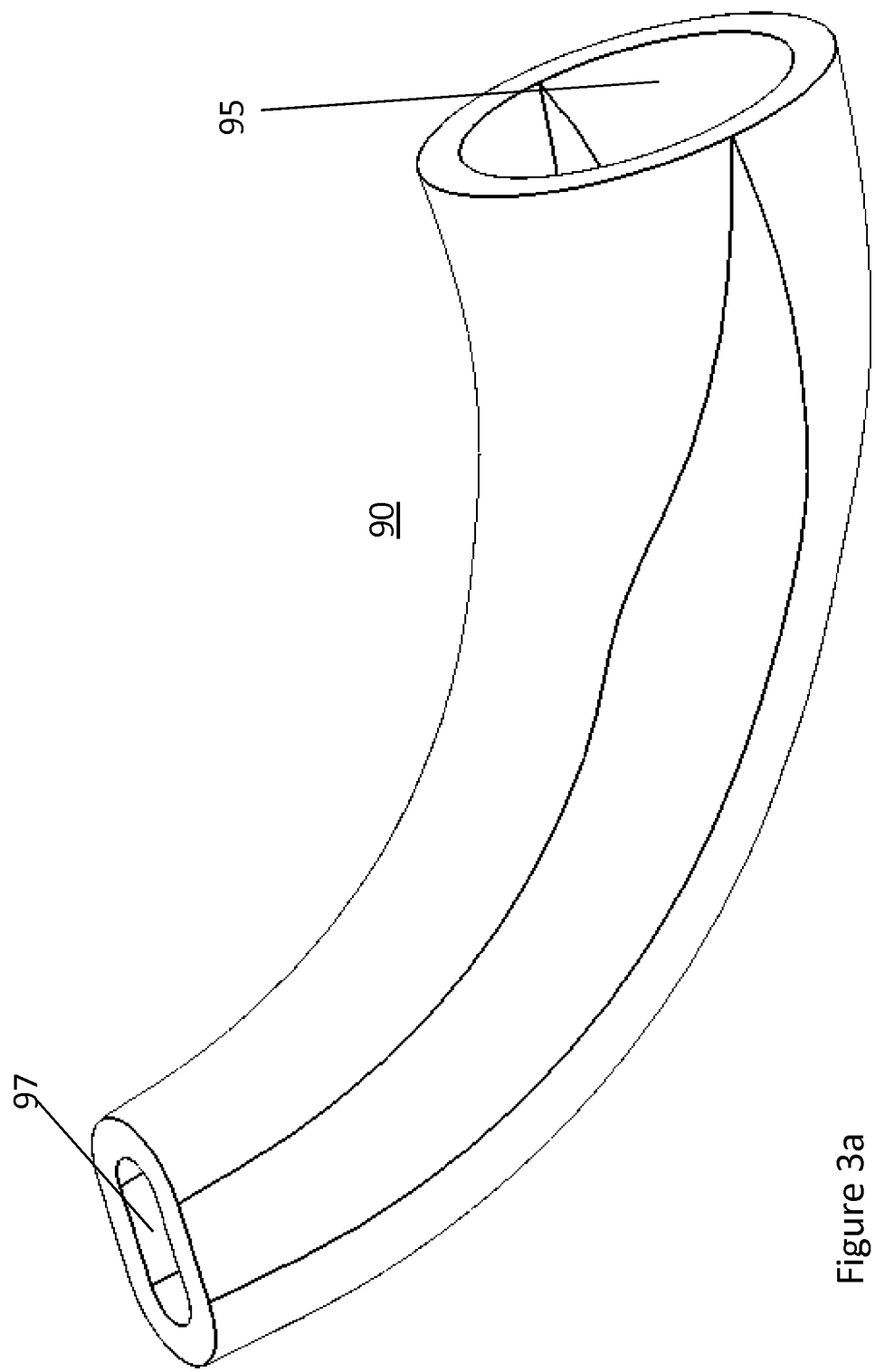
FIG. 3a is an upper perspective view of a water diverter of a fabric laying system, according to an embodiment of the present disclosure.
Figure 3B:
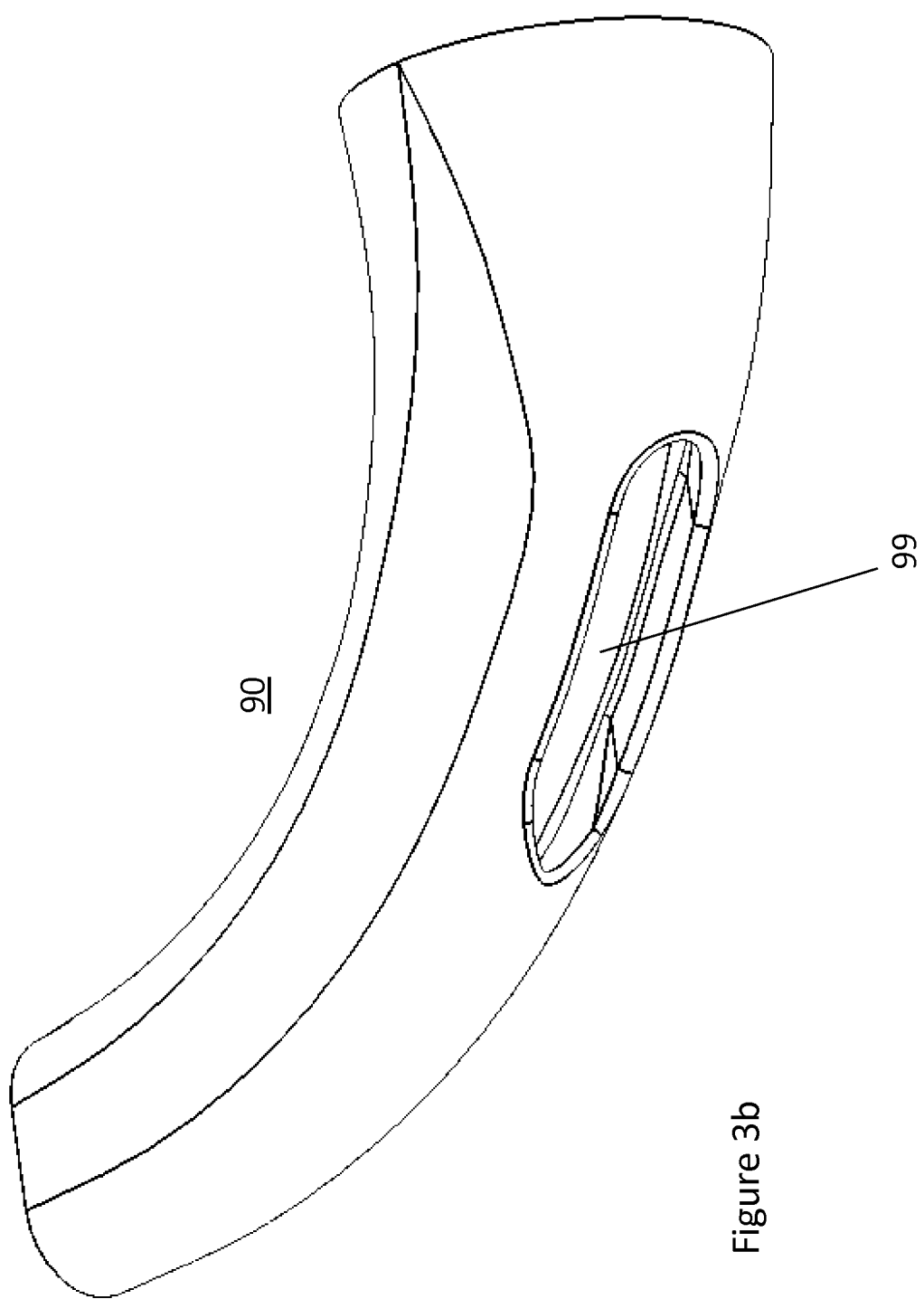
FIG. 3b is a lower perspective view of a water diverter of a fabric laying system, according to an embodiment of the present disclosure.

In one variant of the system, a water diverter is used to deposit piles of material, in this case sand, on the fabric laid down. Such a water diverter is illustrated in FIGS. 3a and 3b. The water diverter 90 is shown as having an inflow aperture 95, an outflow aperture 97 and a sand diverting slot 99. The water diverter 90 may be positioned at a lower end of the hose (not shown) to divert a larger portion of sand directly onto the material already laid down (not shown) to thereby create a pile of sand. In operation, the mixture of sand and water travels through the hose (not shown) and into the inflow aperture 95 of the diverter 90, the diverter 90 has a 90-degree elbow portion that creates centrifugal acceleration and forces a majority of the mixture to the outside of the elbow portion. As the sand is heavier than water, a majority of the sand will move to the outside of the elbow portion and the diverting slot 99 will split the mixture, resulting in much of the sand falling out of the slot 99 and onto the fabric (not shown). The remainder of the mixture, which will consist primarily of water, will exit through the outflow aperture 97.

Figure 4:
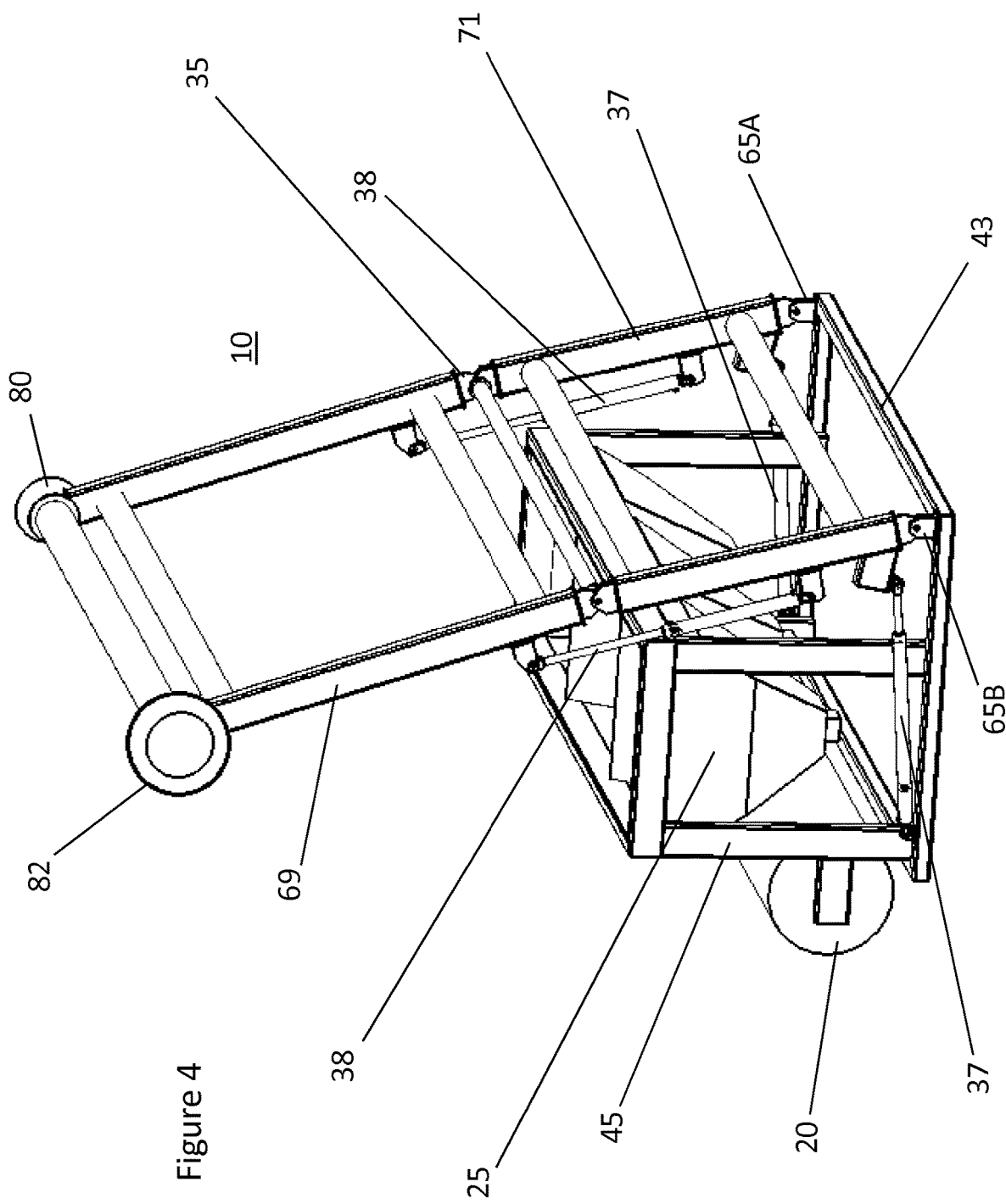
FIG. 4 is a front perspective view of a fabric laying system with first and second pairs of hydraulic cylinders, according to an embodiment of the present disclosure.
Figure 5:
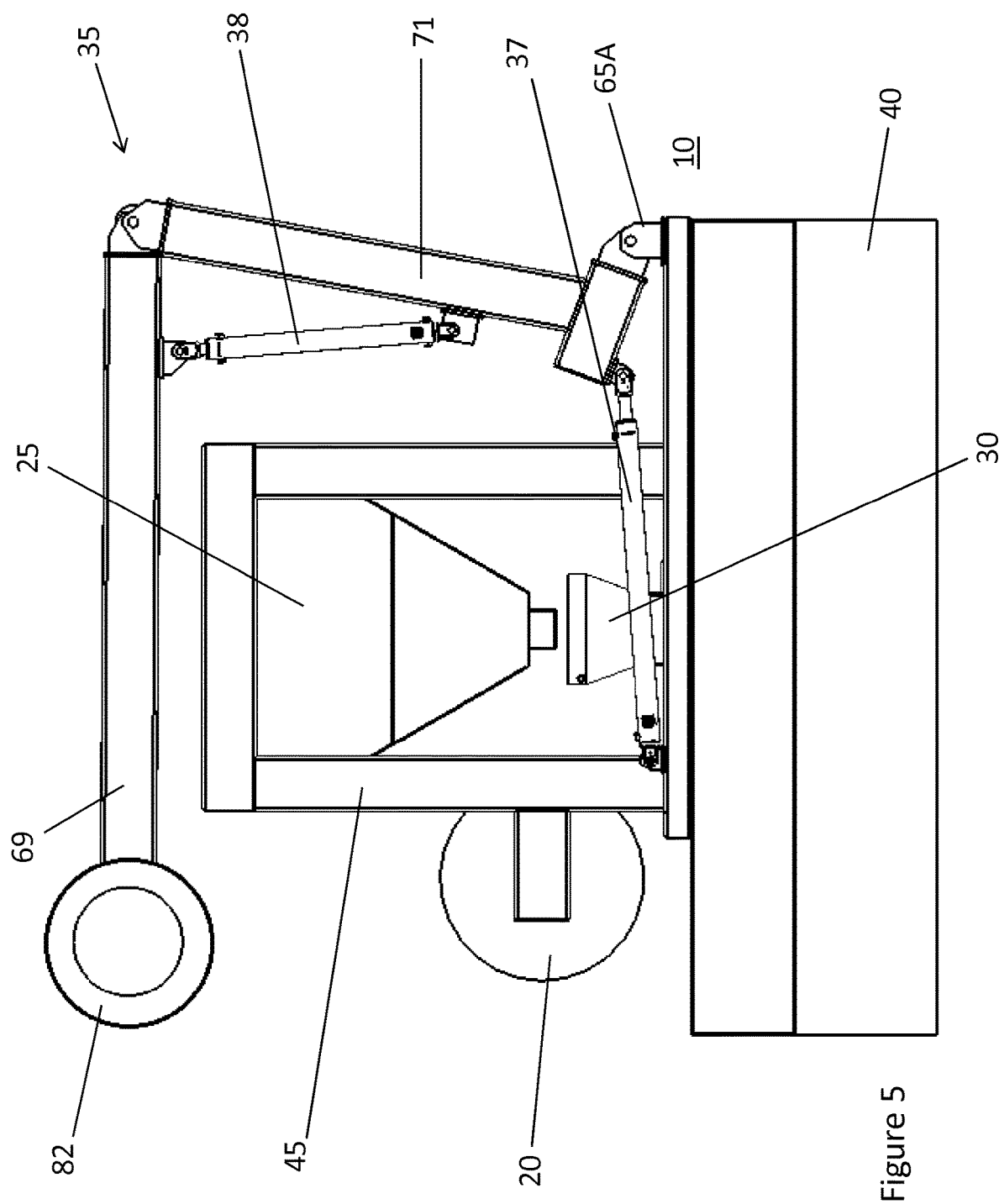
FIG. 5 is a side view of a fabric laying system in a storage position installed on a barge, according to an embodiment of the present disclosure.

Referring to FIGS. 4 and 5, another embodiment of the system is illustrated. In contrast to the embodiment illustrated in FIG. 1, the embodiment in FIGS. 4 and 5 uses a first pair of hydraulic cylinders 37 connected in between a base portion 43 and an upper portion 69 of the articulated frame 35. A second pair of hydraulic cylinders 38 is connected between the upper portion 69 and the lower portion 71 of the articulated frame 35. The first pair of hydraulic cylinders 37 are utilized to pivot the articulated frame 35 about joints 65A, 65B and into and out of the water. The second pair of hydraulic cylinders 38 can be utilized to gently lift the portion 69 of the articulated frame 35 and the wheels 80, 82 to avoid obstructions in the water. Hydraulic cylinders 38 can also be used to transition the frame 35 into a storage configuration for storage onto a barge 40. As can be seen, FIG. 5 illustrates the system 15 in a storage position or configuration.

Figure 6:
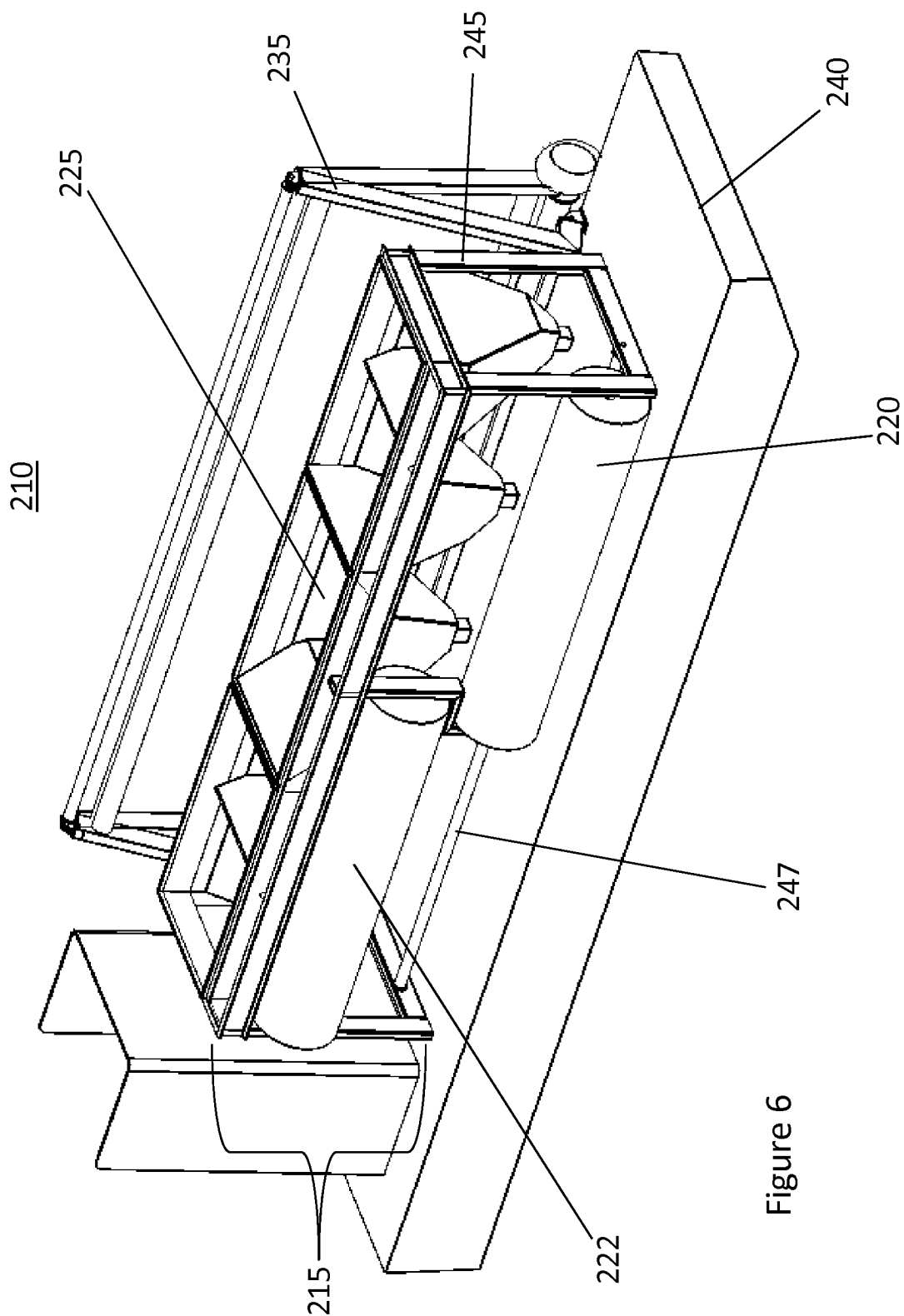
FIG. 6 is a rear perspective view of a fabric laying system installed on a barge, according to another embodiment of the present disclosure.

With reference to FIG. 6, another embodiment of the system is illustrated. In this embodiment, the system 210 is shown as having a dispensing mechanism 215 to dispense a first and second roll of fabric 220, 222, at least one hopper 225, and an articulated frame 235 to lay the first and second fabric 220, 222 on the plant bed. Similar to the other embodiments, the fabric 220, 222 travels under the hopper 225 and funnel (not shown), through the articulated frame 235 and ends at first and second end rollers (not shown). Both sheets of fabric are then laid on the underwater plant beds. In this embodiment, the articulated frame 235 is shown folded in a storage or closed position. Laying fabric using two separate sheets of fabric 220, 222 rather than a single sheet will allow for faster laying of the fabric, and the fabric will be laid more accurately between the pair of adjacent rolls of fabric 220, 222, leading to less overlap and greater coverage.

With reference to FIGS. 7, 8, 9 and 10, another embodiment of the system is illustrated. For this embodiment, the system 310 is positioned on a barge 340 and has a fabric dispensing mechanism 315 to dispense at least one roll of fabric 320, at least one hopper 325, that houses and dispenses sand, and a funnel 330 connected to the hopper 325. In this embodiment, a mixture of sand taken from the hopper 325 and water taken from the surrounding water mass (e.g. the lake or river) is delivered to the funnel 330 by means of a water pump 323. The sand and water mixture is deposited onto the fabric 320 once the fabric is laid on the plant bed underwater by way of the articulated frame 335. The water pump 323 preferably sucks in water at over 200 to 400 gallons per minute.

Figure 7:
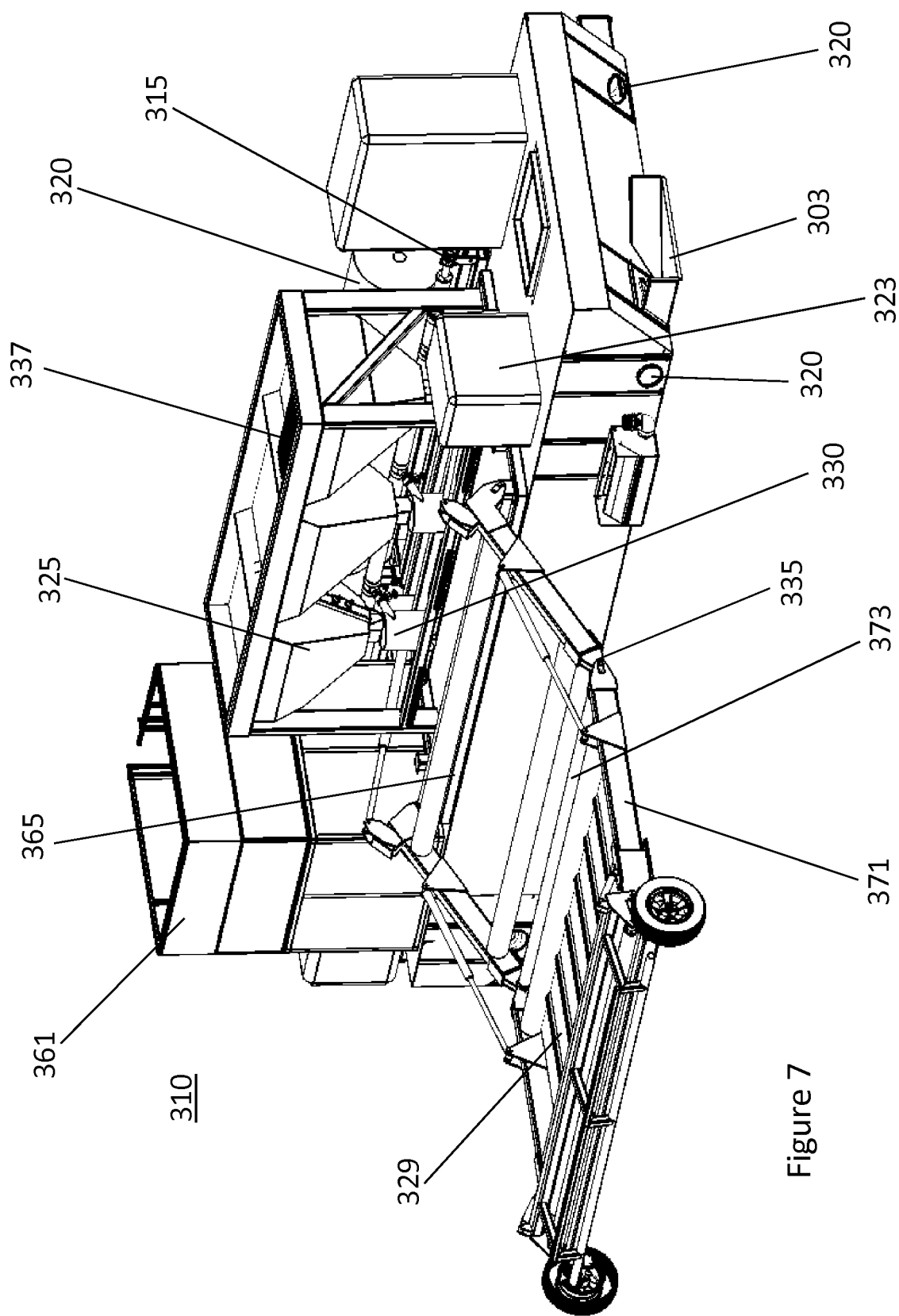
FIG. 7 is a front perspective view of a fabric laying system installed on a barge, according to another embodiment of the present disclosure.

As part of the embodiment in FIG. 7, a grate 337 is also shown, positioned on an upper portion of the hopper 325. The grate 337 is provided to filter out large stones from entering into the system 310, preferably only allowing stones with a maximum width of 1 inch to enter the hopper 325. A worker skilled in the art would appreciate that the grate 337 would preferably cover the entire upper portion of the hopper 325 in the system 310. During operation of the system 310, fabric is forced from the roll 320 through the front roller 365, mid roller 373 and end rollers 360, 362 of the articulated frame 335 by means of an articulated frame roller motor 321 engaged to the end rollers 360, 362. In this embodiment, three hoses (not shown) are connected to the each of the three funnels 330, and travel along the articulated frame 335 to terminate at a position above and further than the end roller 360. A worker skilled in the art would appreciate that the three hoses (not shown) can also terminate at a location beyond the end roller 360. When the hoses (not shown) are terminated at such a location, they allow for the mixture of sand and water to be deposited onto the fabric 320.

Figure 9:
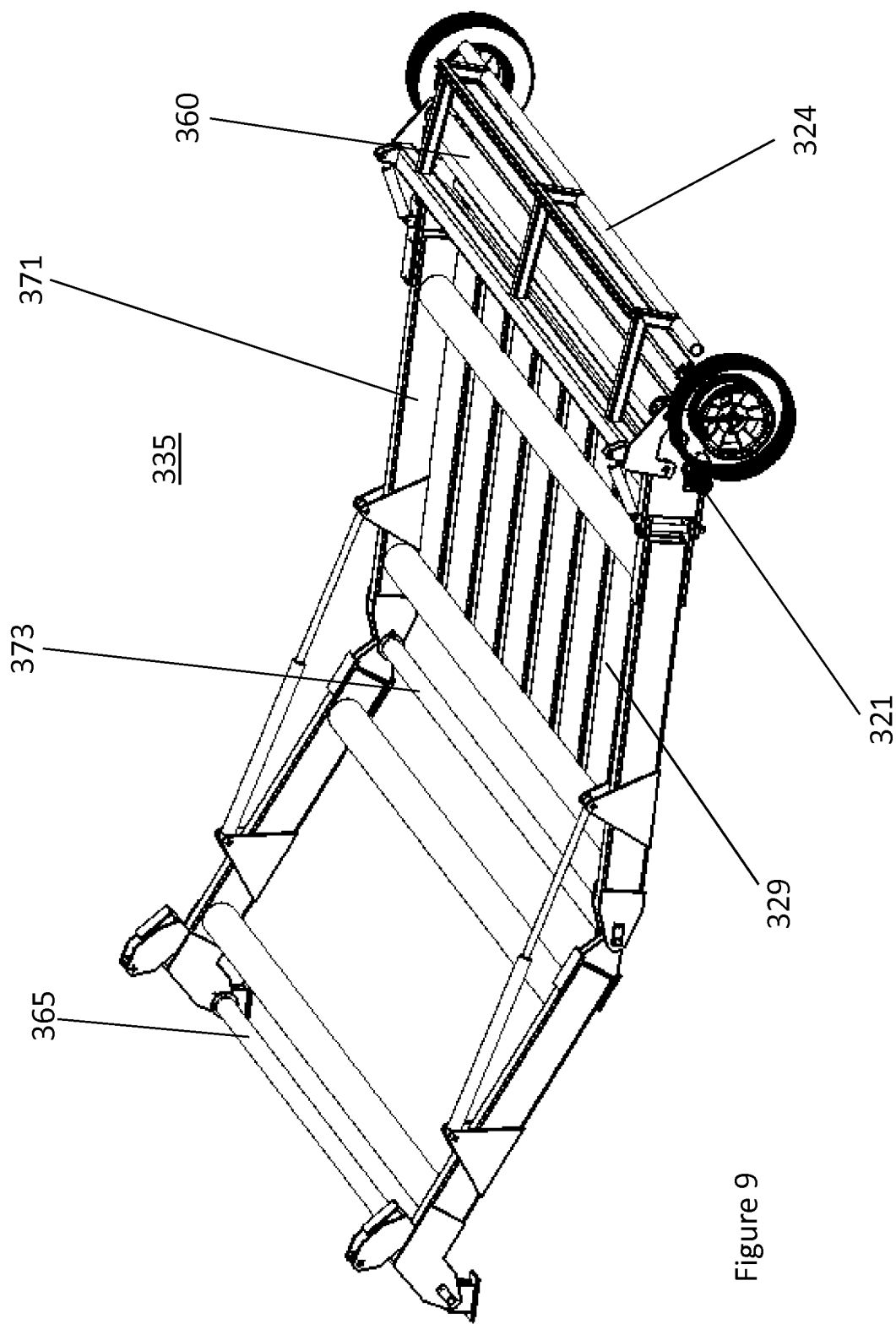
FIG. 9 is a perspective view of an articulated frame of a fabric laying system, according to another embodiment of the present disclosure.
Figure 10:
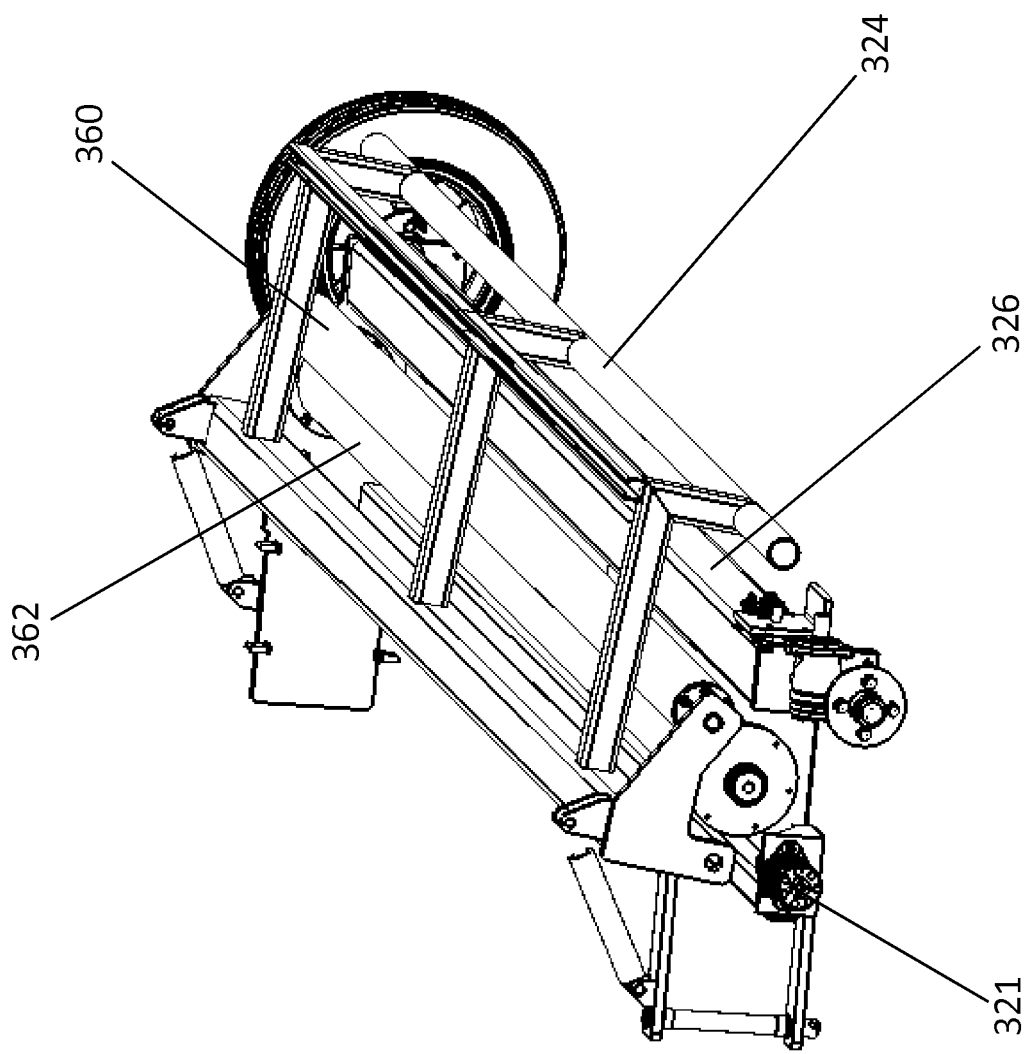
FIG. 10 is a perspective view of a front portion of an articulated frame of a fabric laying system, according to another embodiment of the present disclosure.
Figure 11:
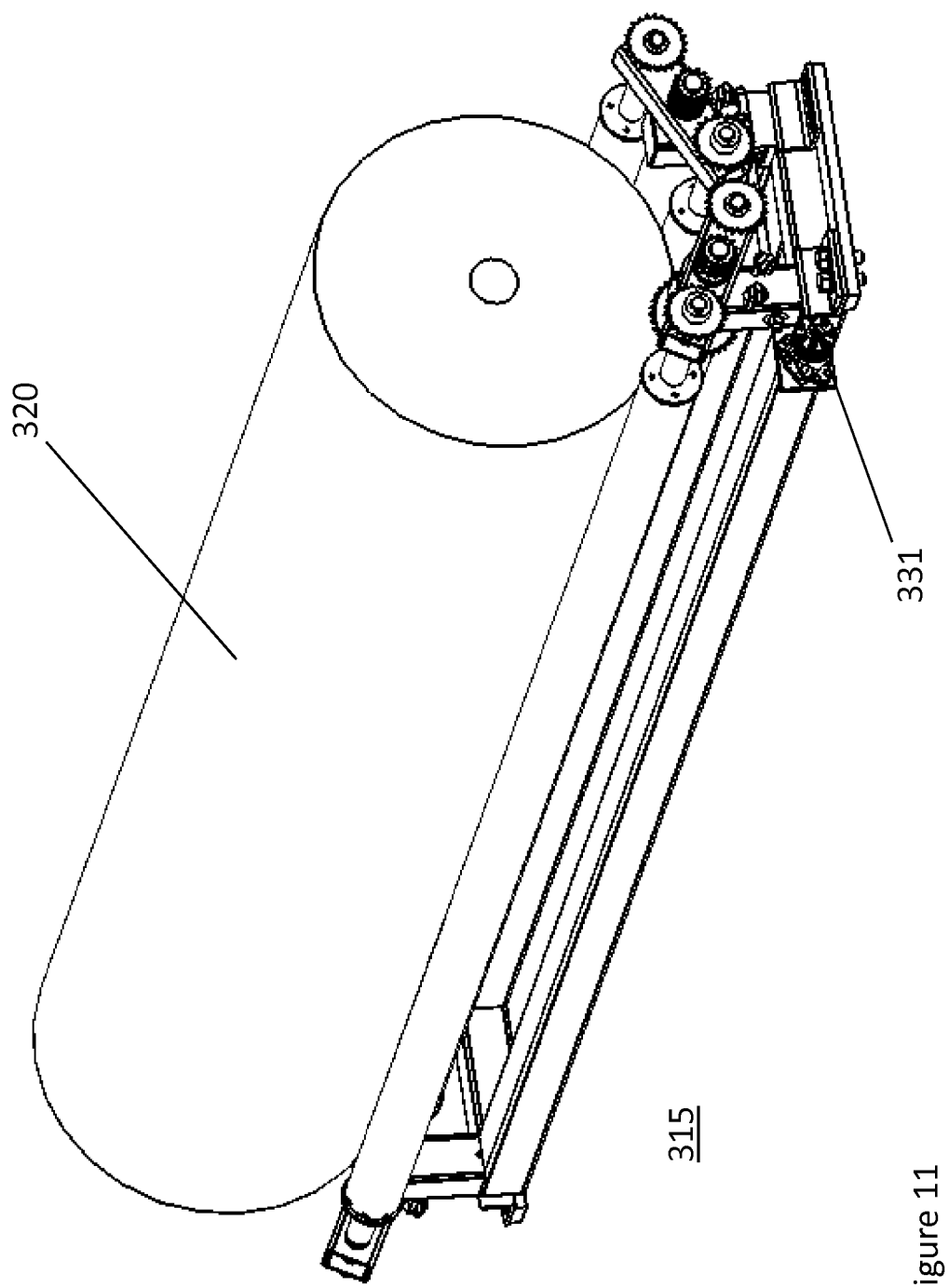
FIG. 11 is a perspective view of a roll of fabric on a fabric dispensing mechanism of a fabric laying system, according to another embodiment of the present disclosure.
Figure 12:
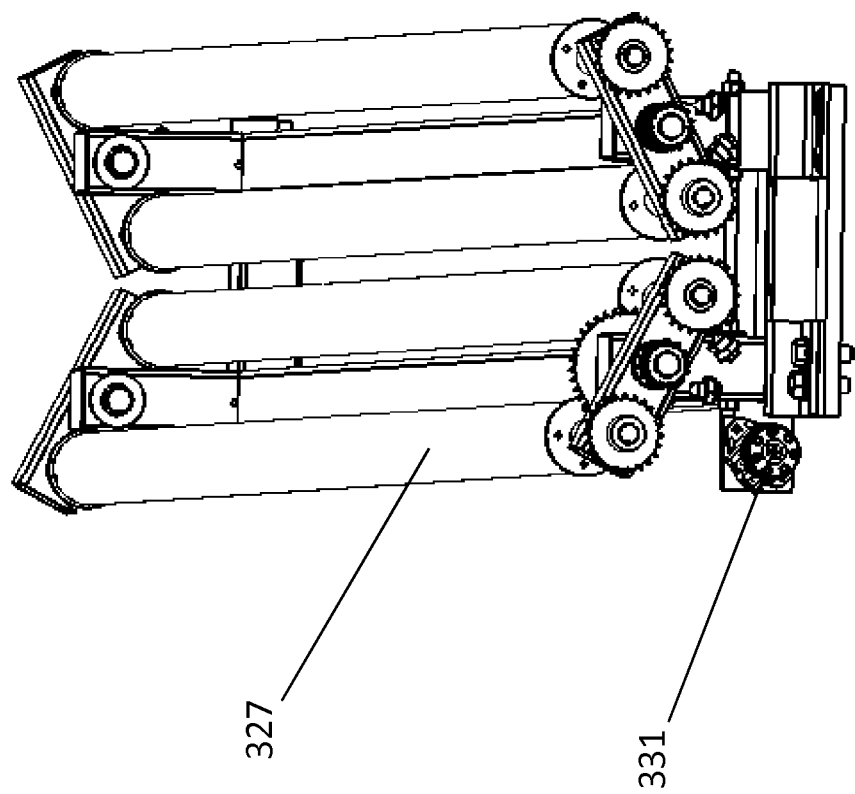
FIG. 12 is an upper perspective view of a fabric dispensing mechanism of a fabric laying system, according to another embodiment of the present disclosure.

Referring to FIGS. 9 and 10, a guide 324 is provided at a lower portion 371 of the articulated frame 335. The guide 324 serves to guide the fabric 320 towards plant bed below the frame 335 when the frame is in use. A cutting member 326 is also present, serving to cut the burlap 320 at a desired length. A plate 329 is also provided at the lower portion 371 of the articulated frame 335. The plate 329 flattens the plant bed before the fabric 320 is laid down. The plate also serves to slide the frame 335 over the plant bed and silt on the lake or river bed. This configuration of the frame 335 is ideally suited for river or lake beds covered in deep silt and could also work on hard lake bottoms.

Figure 8:
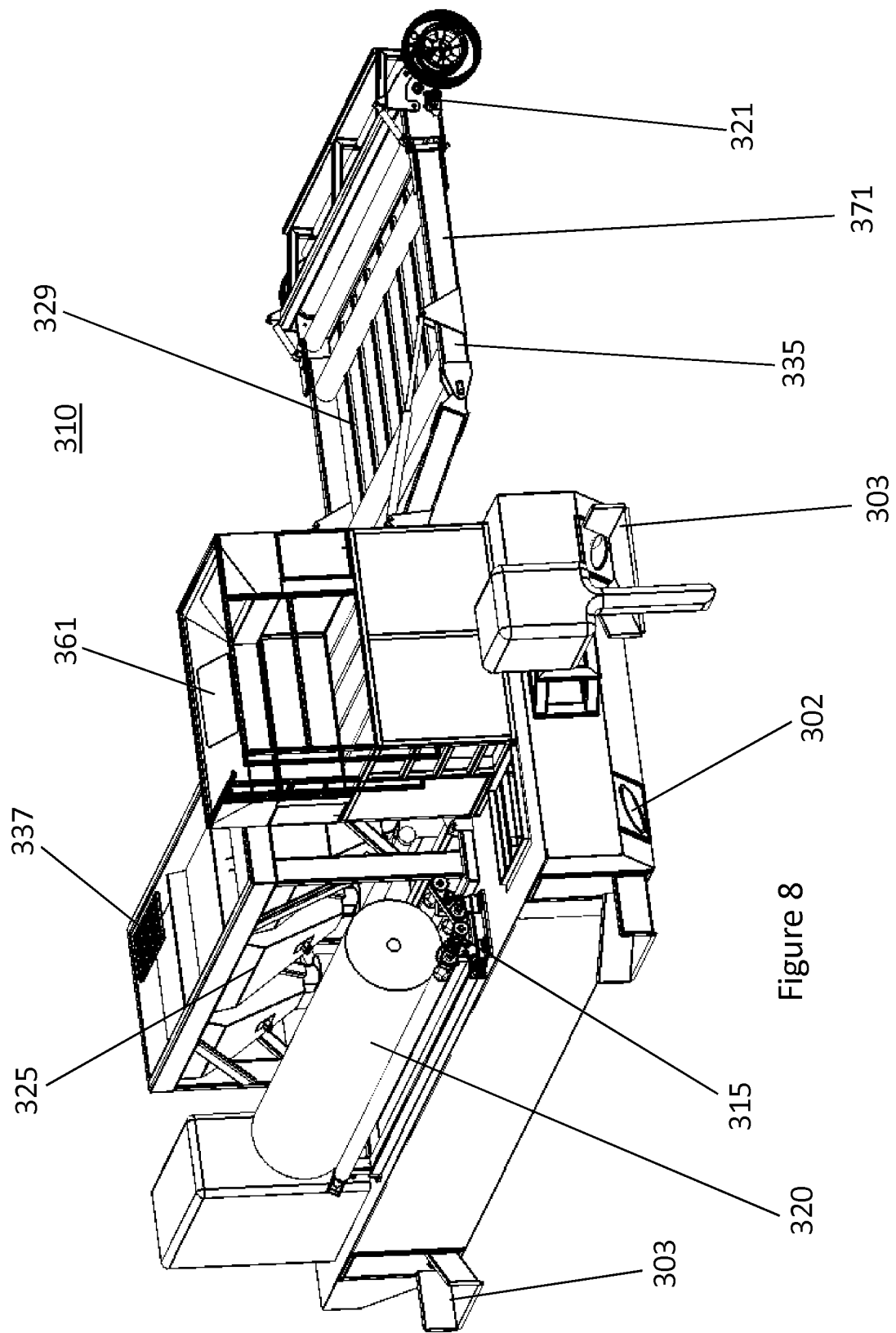
FIG. 8 is a rear perspective view of a fabric laying system installed on a barge, according to another embodiment of the present disclosure.

As another variant of the system, the watercraft may be provided with suitable means of locomotion across the water's surface. Referring to FIGS. 7 and 8, thrusters (not shown) are also provided, positioned within thruster vents 302 of the barge 340 to propel the barge 340 across the water surface. A worker skilled in the art would appreciate that the thrusters are propellers, but other suitable means of thrust can be provided. A worker skilled in the art would also appreciate that, while there are preferably four thrusters (not shown) positioned at the four lower corners of the barge 340, more thrusters (not shown) may be used. These four thrusters (not shown) currently sit in tubes behind the thruster vents 302 and provide propulsion in both the forward and reverse directions to the watercraft. By judiciously using various combinations and levels of forward and reverse thrust, the barge is therefore fully maneuverable across the water's surface.

In another variant, thruster inlets 303 can be positioned at each thruster vents 302 to thereby minimize any damage to surface plants. Since the plants are prevented from being sucked into the thruster vents 302, the plants are therefore not shredded. This serves to prevent invasive plant species (e.g. milfoil) that spread through stem fragmentation from further infesting the area. In addition to this, the thruster inlets 303 also increase the inlet area, thereby reducing the inlet flow velocity. Such a reduction in velocity further helps in minimizing damage to invasive plant species and thereby helps in preventing the further spread of such plants.

Similar to the above, the water pump 323 uses a water pump inlet (not shown) to prevent plants from getting sucked into the water pump 323.

It should be noted that while only four thruster inlets 303 are shown on four corresponding thruster vents 302 in the figures, a worker skilled in the art would appreciate that there are in fact eight thruster inlets 303 as two thruster inlets 303 are required to correspond to the forward and reverse for each thruster (not shown).

The barge 340 is equipped with a console 361 for use by an operator. The operator directs the positioning and speed of the barge 240, in addition to directing the appropriate amount of sand and water to be mixed into the funnels 330. The console 361 may use other controls and electronics related to the system 310. The thrusters (not shown) can be manually controlled or they can be automatically controlled by a computer or by other similar devices such as a microprocessor or a Programmable Logic Controller (PLC). A joystick controller (not shown) may be used to provide intuitive directional control through a computer interface and such a control scheme may include cruise control functionality and rotational control. Fully automated control can be achieved through a Global Navigation Satellite System (GNSS) interface to the computer. Through interface, the GNSS can provide the watercraft's global location to within centimeters. Similarly, through the interface, the GNSS can determine the watercraft's heading to within a degree of accuracy. A touch screen user interface (not shown) allows the operator to lay fabric over plant beds in a fully automated or semi-automated manner. The watercraft's navigation system can also automatically compensate for light cross winds and currents. Sensors (not shown) that determine the angle of the frame 335 and the speed of the drive motor for the end rotors may also be utilized to ensure that the fabric 320 is fed out at the same speed that the watercraft is travelling over the water. Programmable functions for the control system that controls the watercraft and the equipment on the watercraft allow for the control of automated fabric laying speed and fabric overlap between adjacent strips of fabric. A worker skilled in the art would appreciate that further computer programming and proportional controls could be used to fully automate the various functions of the system. A bottom sensor (not shown) may be used to allow the frame 335 to sweep along the river or lake bed with minimal contact between the frame and the bed. This would minimize water floor disturbances and would also minimize disturbances to adjacent fabric strips.

With reference to FIGS. 7, 8, 11 and 12, the fabric dispensing mechanism 315 may include four rolling shafts 327 that are powered by a burlap motor 331. The burlap motor 331 connects a small chain drive system that rotates the rolling shafts 327. Rotating the shafts 327 in turn rolls the roll of fabric 320 at a desired speed to thereby dispense the fabric at that desired speed. Having four rolling shafts 327 provides the ability to support a 1,400-pound roll of fabric 320 and also helps to maintain a constant unrolling for the roll of fabric 320. A sensor (not shown) is also provided within the dispensing mechanism 315 to measure the tension in the fabric portion adjacent to the upper portion of the articulated frame (not shown). If the tension measured is too high (i.e. the fabric portion is too taut), the burlap motor 331 is engaged to thereby cause the roll of fabric 320 to turn faster. This feeds more fabric from the fabric roll and eases the tension on the fabric portion adjacent to the frame. This also reduces the load on the articulated frame roller motor (not shown) as less effort is required from the roller motor to pull the fabric from the fabric path. If the burlap motor 331 were not present, the articulated frame roller motor (not shown) may be required to rotate a large and heavy roll of fabric 320. Such a strain on the roller motor may lead to motor failure and/or torn fabric.

Figure 13:
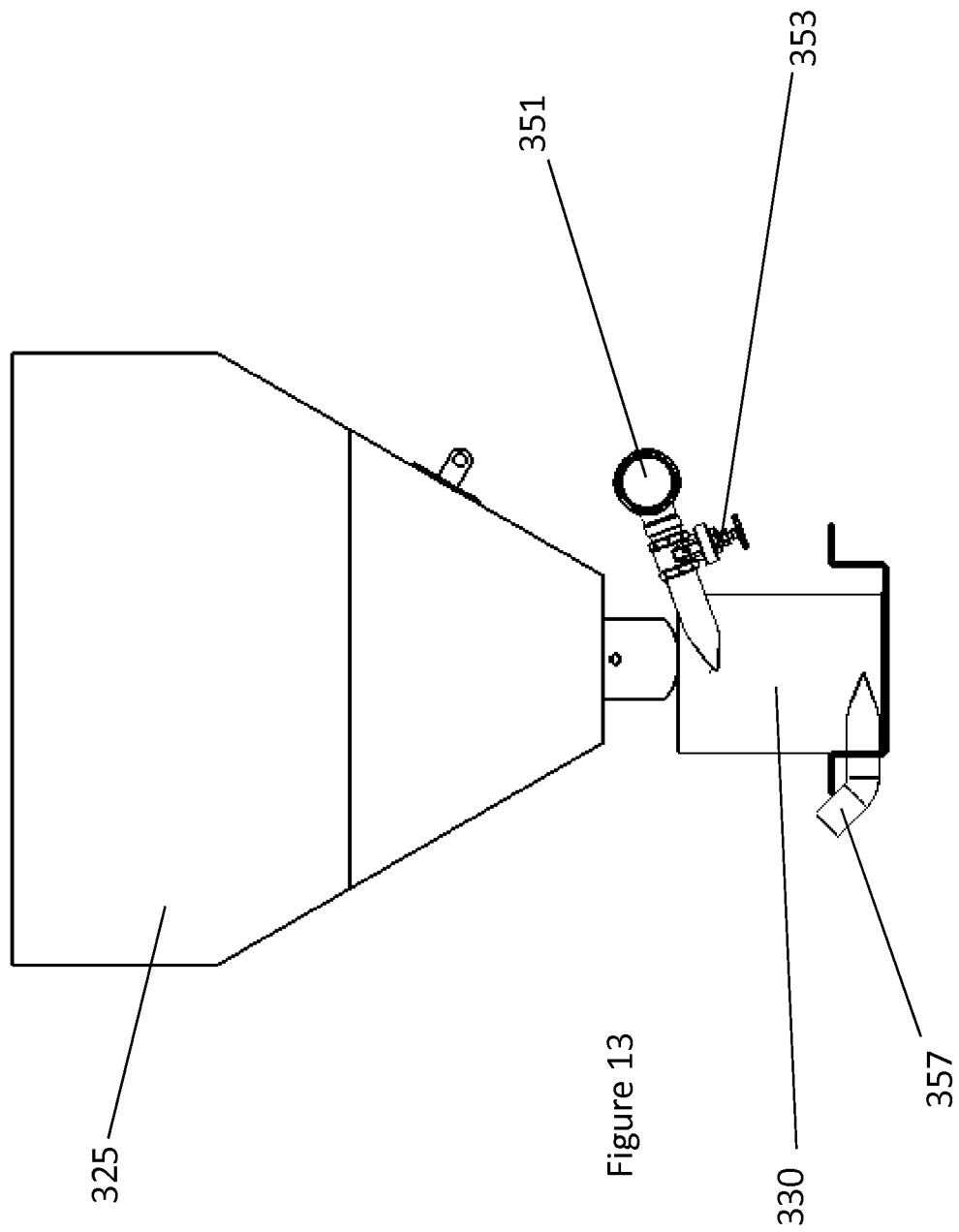
FIG. 13 a side view of a funnel engaged with a hopper and a water pipe of a fabric laying system, according to another embodiment of the present disclosure.
Figure 14:
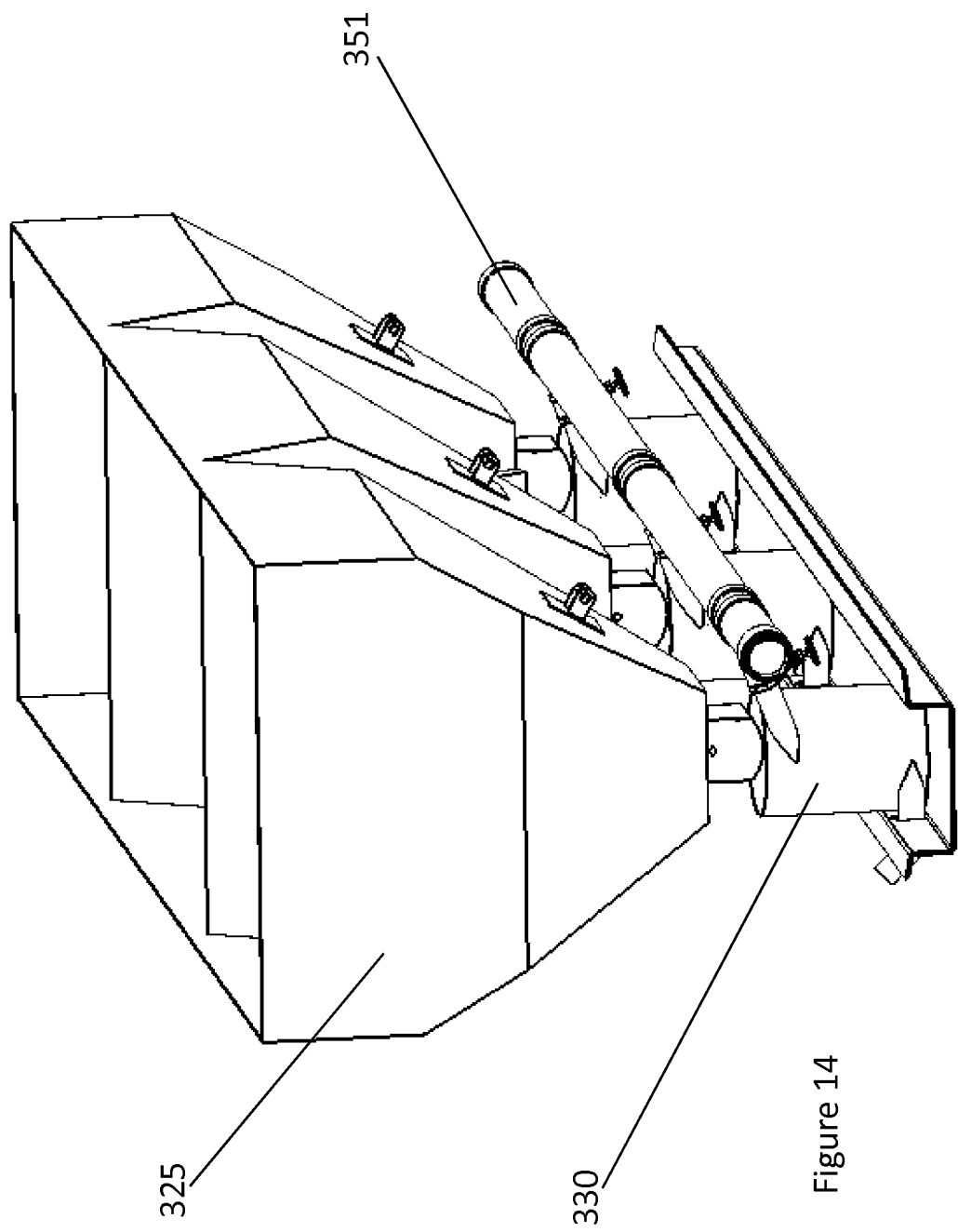
FIG. 14 is a perspective view of a funnel engaged with a hopper and a water pipe of a fabric laying system, according to another embodiment of the present disclosure.

With reference to FIGS. 13 and 14, the funnels 330 are shown attached to a water pipe 351 with the water pipe 351 being connected to the water pump (not shown). A water valve 353 is positioned between the water pipe 351 and the funnel 330 to regulate the amount of water dispensed into the funnel 330 for mixing with the sand. A hopper valve (not shown) is also positioned on the lower end of the hopper 325 to dispense the required amount of sand from the hopper 325 into the funnel 330. To ensure a smooth and continuous flow of the sand and water mixture from the funnel to the hose, the appropriate amount of sand and water must be dispensed into the funnel 330. The sand and water mixture are passed from the funnel 330 through a dispensing pipe 357 through to the hose (not shown). A worker skilled in the art would appreciate that both the hopper valve (not shown) and the water valve 353 could be operated manually or electronically by means of sensors that are used to measure the appropriate amount of sand and water needed to provide a constant flow of the mixture into the membrane 357.

Figure 15:
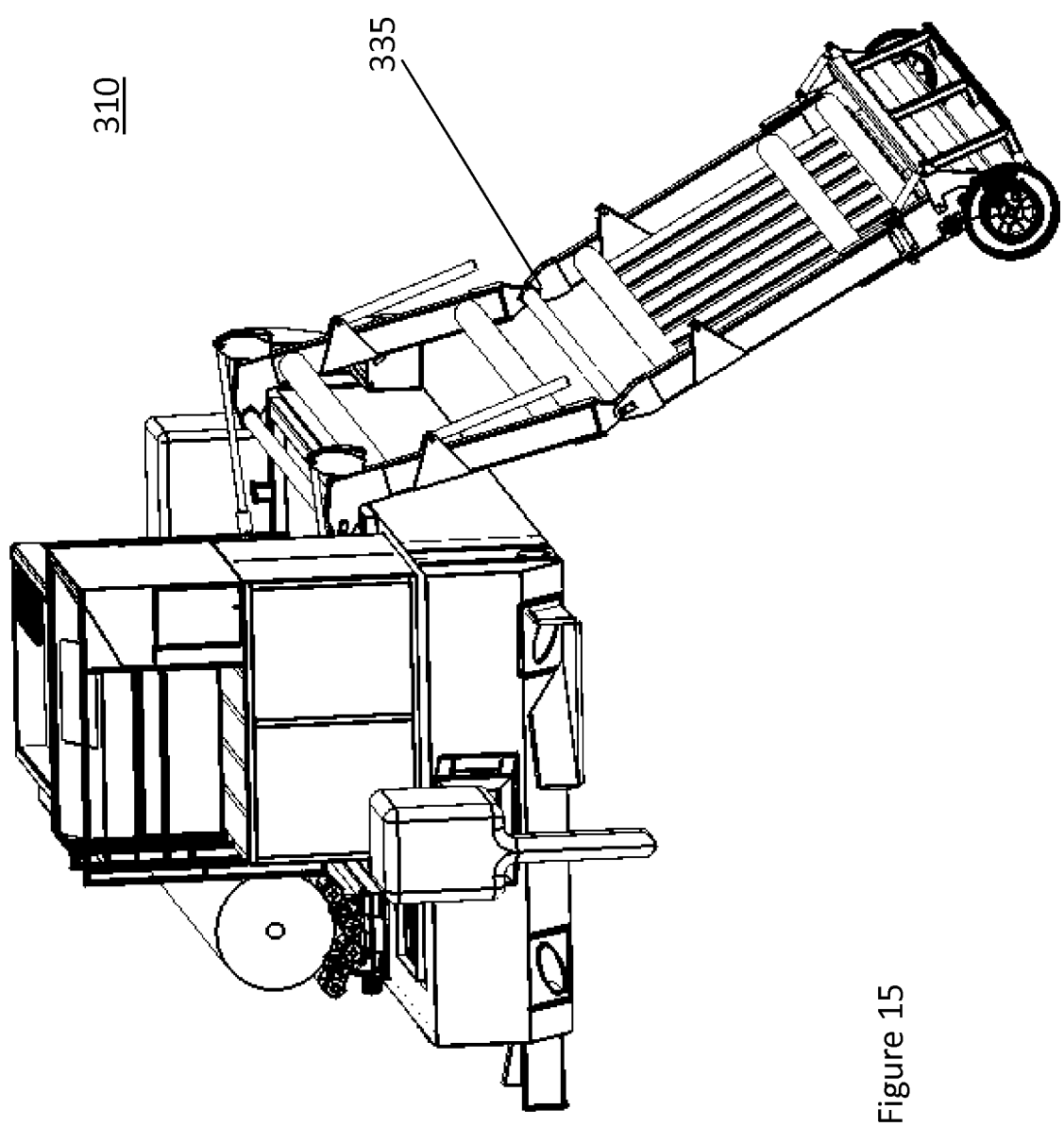
FIG. 15 is a front perspective view of a fabric laying system in a deep water position installed on a barge, according to an embodiment of the present disclosure.
Figure 16:
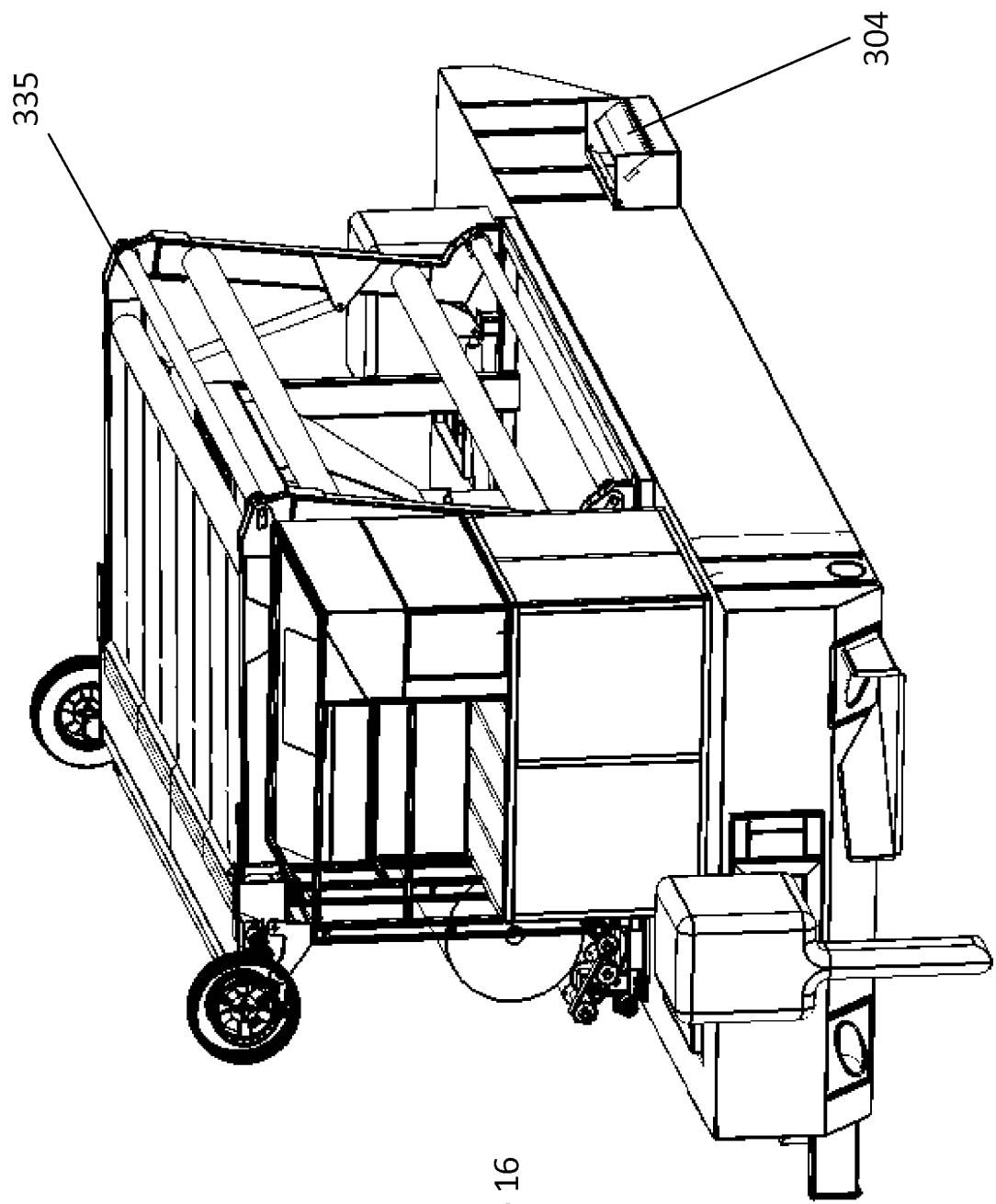
FIG. 16 is a front perspective view of a fabric laying system in a storage position installed on a barge, according to an embodiment of the present disclosure.

With reference to FIG. 15, the system 310 is shown with the articulated frame 335 in a near fully extended position. This configuration may be used to reach a deep water floor. With reference to FIG. 16, the system 310 is shown with the articulated frame 315 in a storage position or configuration. Also shown in FIG. 16 is a water pump inlet with a Weir gate 304. The Weir gate is used to prevent plants being drawn into the high-volume water pump 323. The skimming effect of the Weir gate 304 and its larger surface area slows down the suction velocity of the water pump 323. This can be used to prevent plants on the surface of the water from being drawn into the water pump inlet.

Figure 17:
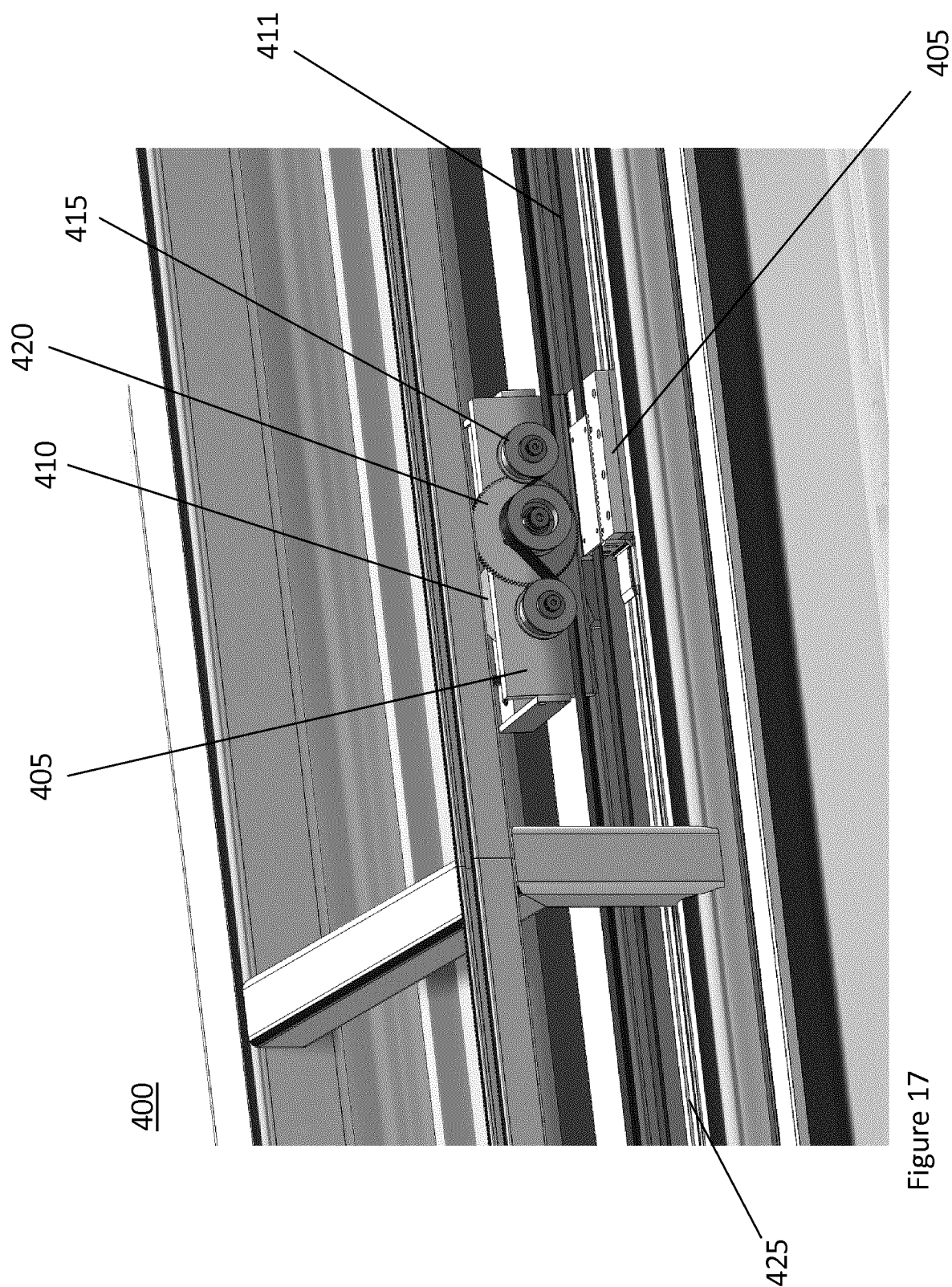
FIG. 17 is a perspective view of a cutting mechanism of a fabric laying system according to an embodiment of the present disclosure.

With reference to FIG. 17, a cutting mechanism 400 is shown. The cutting mechanism has a carriage 405 and a blade 410 to cut the fabric. The cutting mechanism 400 also has three pulleys 415 operatively engaged with a first gear 420, with the gear 420 engaging the blade 410. The cutting mechanism 400 is driven by a timing belt 425 that engages a second gear (not shown) of the cutting mechanism 400. As the opposite side of the timing belt 425 passes through the pulleys 415, the pulleys 415 turn the first gear 420. This, in turn, causes the blade 410 to rotate and to thereby cut the fabric.

Figure 18:
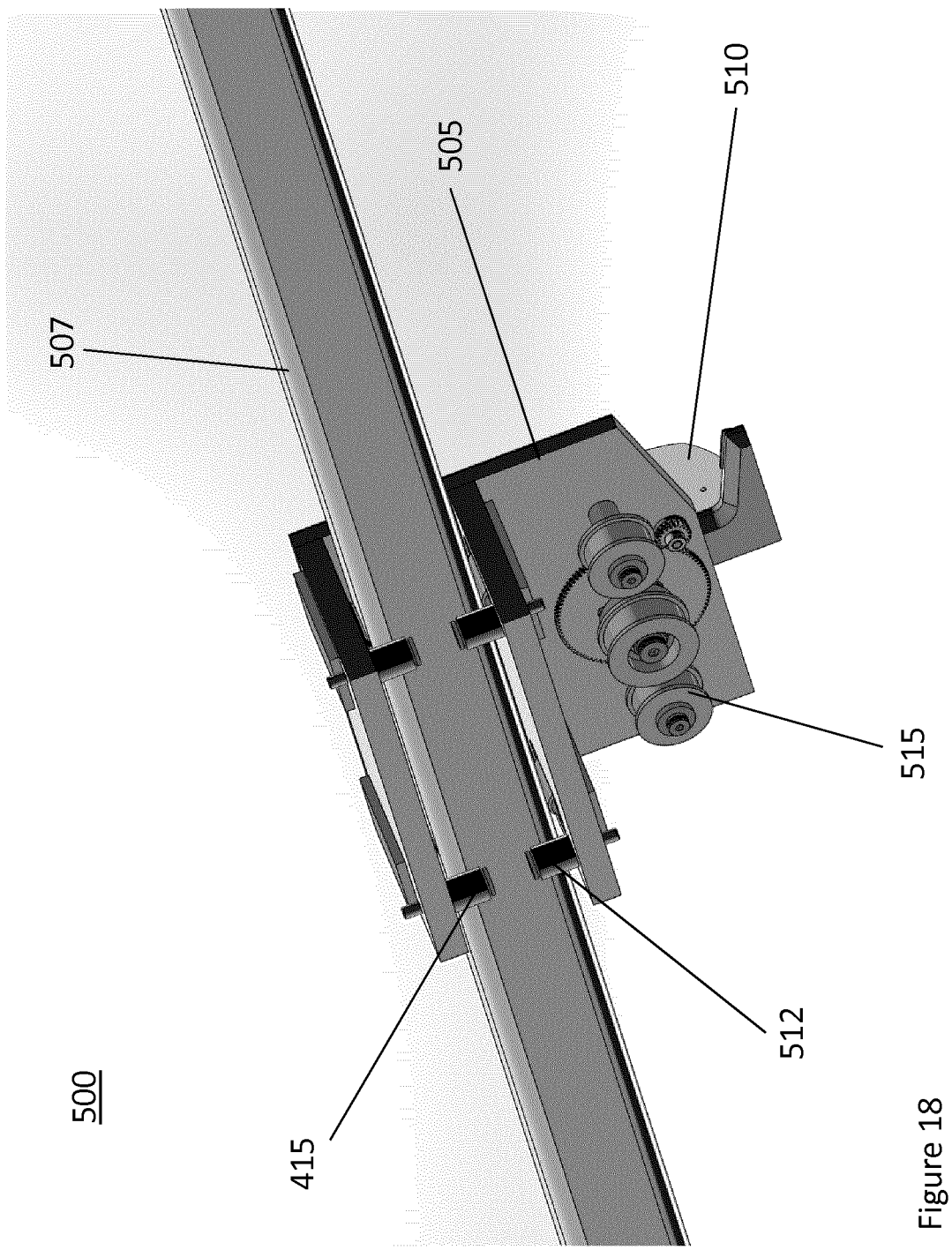
FIG. 18 is a perspective view of a cutting mechanism of a fabric laying system according to another embodiment of the present disclosure; and, FIG. 19 is a perspective view of a cutting mechanism of a fabric laying system according to yet another embodiment of the present disclosure.

With reference to FIG. 18, another cutting mechanism 500 is shown. For this embodiment, a carriage 505 and a blade 510 are provided to cut the fabric. The cutting mechanism 500 also has rollers 512 that allow the cutting mechanism 500 to slide along a shaft 507 of the system. A worker skilled in the art would appreciate that the carriage 505 may use other means to slide along the shaft 507 of the system, such as wheels, ball bearings, etc. For this embodiment, the cutting mechanism utilizes the rollers 512 to guide the cutting mechanism 500 along the shaft 507 (timing belt not shown). A worker skilled in the art would also appreciate another drive method which could use the friction created between a belt or cable (not shown) and the pulleys 515 to drive the cutting mechanism 500 or a rack and pinion system (not shown).

Figure 19:
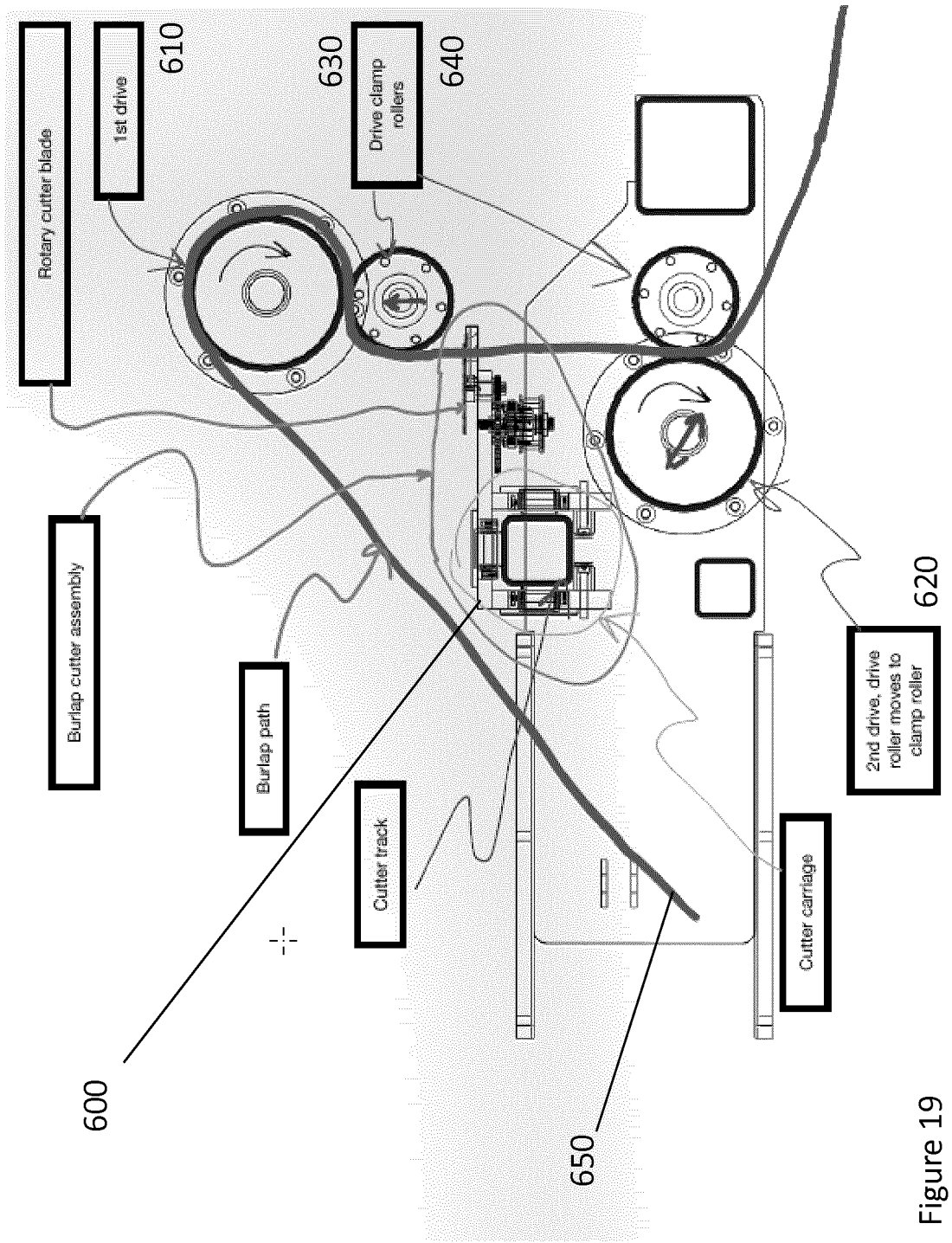

With reference to FIG. 19, yet another cutting mechanism 600 is shown. This mechanism is a two-drive system with first and second drives 610, 620 and first and second drive clamp rollers 630, 640. These drives and rollers hold and guide the fabric 650. The fabric 650 is cut by the cutting mechanism 600 and the second drive 620 and second drive clamp roller 640 pull on the newly cut fabric 650 to thereby cause the cut fabric to drop from the mechanism.

It should be noted that, while reference is made above to jute burlap as a suitable fabric for use with the invention, other similar fabrics may also be used. The fabric generally known as "burlap", whether made from jute, flax, sisal, or hemp may be used. Similarly, other fabrics which are coarsely woven from natural fibers may also be used. Such other fabrics would, preferably, also be biodegradable and would also allow indigenous plant species to grow through the fabric. As noted above, the preferred end result is the suppression if not death of invasive plant species such as milfoil. A worker skilled in the art would also appreciate that the term "water floor" has been used to describe a riverbed, benthic layer, lakebed, seabed, or floor of any other water mass.

A worker skilled in the art would appreciate that the barge could be sold as part of the system. Retractable axles and wheels under the barge would be provided to eliminate the need and expense for a flatbed transport trailer. More importantly, since a barge sits 3 feet off the ground on a flatbed, and since the barge is 3 feet deep, this limits the equipment height on top of the barge to 7 feet as the total height of the flatbed, barge and its equipment must stay within 13 feet due to regulations. The retractable wheels would also allow the barge to be launched in shallower water (e.g. 1.5-ft instead of 4.5-ft) since the typically 3-ft high flatbed trailer is not required and the wheels retract. This would both reduce the overall height. Such retractable wheels would also be particularly useful for shallow boat ramps.

Many modifications of the embodiments described herein as well as other embodiments may be evident to a person skilled in the art having the benefit of the teachings presented in the foregoing description and associated drawings. It is understood that these modifications and additional embodiments are captured within the scope of the contemplated disclosure which is not to be limited to the specific embodiment disclosed.

What is claimed is:

1. A system for laying fabric over an underwater plant bed, the system comprising:
   a fabric dispensing mechanism for dispensing fabric from a fabric stockpile;
   a frame receiving said fabric from said fabric dispensing mechanism, said frame being for guiding said fabric over said plant bed;
   wherein said fabric is laid atop said plant bed when said fabric has been guided over said plant bed such that at least a portion of said plant bed is covered by said fabric, and wherein said system is installed on a watercraft.

2. A system according to claim 1, further including a material depositing mechanism for depositing a material over fabric that covers said portion of said plant bed, said material being for weighing down said fabric to prevent said fabric being displaced from said plant bed.

3. A system according to claim 2, wherein said material comprises at least one of: sand, gravel, stones, soil, and clay.

4. A system according to claim 2, wherein said material depositing mechanism comprises at least one container for mixing said material and water, a resulting mixture being used to weigh down said fabric.

5. A system according to claim 2, wherein said material is deposited in discrete piles atop said fabric.

6. A system according to claim 2, wherein said material is deposited at an edge of said fabric that covers said portion of said plant bed.

7. A system according to claim 1, wherein said fabric is coarse woven from a natural fiber.

8. A system according to claim 7, wherein said fabric is at least one of: jute burlap, flax burlap, sisal burlap and hemp burlap.

9. A system according to claim 1, wherein said frame comprises a drive motor for pulling said fabric from said fabric dispensing mechanism.

10. A system according to claim 1, wherein said fabric dispensing mechanism comprises at least one roller.

11. A system according to claim 1, wherein said fabric dispensing mechanism comprises at least one drive motor.

12. A system according to claim 1, wherein said system further comprises a fabric cutting mechanism for cutting said fabric once said fabric covers said portion of said plant bed.

13. A system according to claim 1, wherein said frame is an articulated frame having a deployed position and a storage position.

14. A system according to claim 12, wherein said fabric is laid atop said plant bed while said watercraft travels across a body of water.

15. A system according to claim 1, wherein said plant bed comprises plants of an invasive species.

* * * * *